(12) United States Patent
Khan et al.

(10) Patent No.: US 12,093,704 B2
(45) Date of Patent: Sep. 17, 2024

(54) DEVICES, METHODS, SYSTEMS, AND MEDIA FOR AN EXTENDED SCREEN DISTRIBUTED USER INTERFACE IN AUGMENTED REALITY

(71) Applicants: Taslim Arefin Khan, Scarborough (CA); Szu Wen Fan, Markham (CA); Changqing Zou, Markham (CA); Jianpeng Xu, Markham (CA); Wei Li, Markham (CA)

(72) Inventors: Taslim Arefin Khan, Scarborough (CA); Szu Wen Fan, Markham (CA); Changqing Zou, Markham (CA); Jianpeng Xu, Markham (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/228,087

(22) Filed: Apr. 12, 2021

(65) Prior Publication Data
US 2022/0326967 A1    Oct. 13, 2022

(51) Int. Cl.
*G06F 9/451* (2018.01)
*G06F 3/04815* (2022.01)
(Continued)

(52) U.S. Cl.
CPC .......... *G06F 9/451* (2018.02); *G06F 3/04815* (2013.01); *G06F 3/1423* (2013.01); *G06T 19/006* (2013.01); *G06F 16/90* (2019.01)

(58) Field of Classification Search
CPC .... G06F 9/451; G06F 3/04815; G06F 3/1423; G06T 19/006
See application file for complete search history.

(56) References Cited

U.S. PATENT DOCUMENTS

2018/0173315 A1    6/2018    Hall et al.
2018/0332335 A1    11/2018   Mullins
(Continued)

FOREIGN PATENT DOCUMENTS

EP    3386204 A1    10/2018

OTHER PUBLICATIONS

Fengyuan Zhu and Tovi Grossman, "BISHARE: Exploring Bidirectional Interactions Between Smartphones and Head-Mounted Augmented Reality", In Proceedings of the 2020 CHI Conference on Human Factors in Computing Systems (CHI '20). Association for Computing Machinery, New York, NY, USA, 1-14. DOI:https://doi.org/10.1145/3313831.3376233, 2020.
(Continued)

*Primary Examiner* — Matthew Salvucci

(57) ABSTRACT

Devices, methods, systems, and media are described for providing an extended screen distributed user interface in an augmented reality environment. GUI layout information for laying out a conventional 2D GUI is processed in order to generate an extended screen DUI for display partially on a 2D display device and partially on one or more virtual screens of an AR environment viewed using an AR display device, such as a head mounted display. GUI elements are laid out in the DUI based on a primary modality of the GUI element (input or output), and/or based on spatial dependencies between GUI elements encoded in the GUI layout information. Methods for switching focus between two software application instances displayed in the DUI are also disclosed.

20 Claims, 10 Drawing Sheets

(51) Int. Cl.
*G06F 3/14* (2006.01)
*G06T 19/00* (2011.01)
*G06F 16/90* (2019.01)

(56) References Cited

U.S. PATENT DOCUMENTS

2019/0179406 A1   6/2019   Manda et al.
2020/0201514 A1   6/2020   Murphy et al.
2021/0373833 A1*  12/2021  Pawar .................... G06F 1/3231

OTHER PUBLICATIONS

Jie Ren, Yueting Weng, Chengchi Zhou, Chun Yu, and Yuanchun Shi, Understanding Window Management Interactions in AR Headset + Smartphone Interface. In Extended Abstracts of the 2020 CHI Conference on Human Factors in Computing Systems (CHI EA '20). Association for Computing Machinery, New York, NY, USA, 1-8. DOI: https://doi.org/10.1145/3334480.3382812., 2020.

Barrett Ens, Juan David Hincapié-Ramos, and Pourang Irani, "Ethereal planes: a design framework for 2D information space in 3D mixed reality environments", In Proceedings of the 2nd ACM symposium on Spatial user interaction (SUI '14). Association for Computing Machinery, New York, NY, USA, 2-12. DOI:https://doi.org/10.1145/2659766.2659769, 2014.

Michael Nebeling and Anind K. Dey, "XDBrowser: User-Defined Cross-Device Web Page Designs", In Proceedings of the 2016 CHI Conference on Human Factors in Computing Systems (CHI '16). Association for Computing Machinery, New York, NY, USA, 5494-5505. DOI:https://doi.org/10.1145/2858036.2858048.

Jens Grubert, Matthias Heinisch, Aaron Quigley, and Dieter Schmalstieg, "MultiFi: Multi Fidelity Interaction with Displays On and Around the Body", In Proceedings of the 33rd Annual ACM Conference on Human Factors in Computing Systems (CHI '15). Association for Computing Machinery, New York, NY, USA, 3933-3942. DOI:https://doi.org/10.1145/2702123.2702331, 2015.

E. Normand and M. J. McGuffin, "Enlarging a Smartphone with AR to Create a Handheld VESAD (Virtually Extended Screen-Aligned Display)", IEEE International Symposium on Mixed and Augmented Reality (ISMAR), Munich, Germany, 2018, pp. 123-133, doi: 10.1109/ISMAR.2018.00043.

* cited by examiner

DEVICES, METHODS, SYSTEMS, AND MEDIA FOR AN EXTENDED SCREEN DISTRIBUTED USER INTERFACE IN AUGMENTED REALITY

RELATED APPLICATION DATA

This is the first patent application related to this matter.

FIELD

The present application generally relates to graphical user interfaces in extended reality environments, and in particular to devices, methods, systems, and media for providing an extended screen distributed user interface in an augmented reality environment.

BACKGROUND

Augmented Realty (AR) and Mixed Reality (MR) have become increasingly popular in recent years. MR implements an AR environment in which real-world elements of a user's physical environment can affect the behavior of virtual elements of the user's virtual environment, and thus several techniques and methods are applicable to both fields. One example is techniques for managing user interaction with graphical user interface (GUI) elements and other virtual objects that are spatially located in the virtual 3D space surrounding the user. Such interaction techniques are applicable to both AR and MR; accordingly, the term augmented reality or AR may be used herein to encompass both AR and MR.

In AR, virtual objects are spatially located in a virtual three-dimensional (3D) space surrounding the user as represented to the user through an AR display, unlike laptop or phone displays wherein viewable objects are confined to a two-dimensional (2D) space of a fixed, limited size, resulting in a constraint for GUI design based on limited "screen real estate". In particular, AR technologies using head-mounted displays (HMD), referred to as AR-HMD, enable a user to view virtual objects located in any virtual direction relative to the user by tracking the user's head and/or eye movements, thereby expanding the user's potential viewable area to a completely panoramic field in three dimensions (i.e. a spherical panoramic view). Thus, even though the field of view (FOV) presented to a user at any given head or gaze direction is relatively narrow (e.g., 90 degrees or 120 degrees), the user may move his or her head or eyes to scan across the virtual visual field to encompass the entire spherical panorama.

Thus, AR-HMD technologies can provide additional virtual screen real estate on-demand in the virtual environment, visible through the user's HMD. This additional virtual screen area is referred to as "extended screen" in AR terminology. An extended screen is an information space viewable through AR-HMD. The use of extended screens enables a further technology called Distributed User Interface (DUI) in AR. In DUI, a graphical user interface (GUI) is semantically divided across multiple digital devices. The distribution of GUI elements typically follows some logical distribution, such as distributing an interactive GUI element to the best-fit digital device that for interaction, thereby enhancing the input-output capabilities of the entire user experience. For example, DUI may be used in the context of a video streaming application on a tablet device, wherein the video streaming application includes a video content GUI element and an interactive control panel GUI element. In the presence of a big screen device such as a smart television, the video streaming application may display the video content GUI element on the big screen device (i.e. play the video on the television) while the interactive control panel GUI element is displayed on the tablet device (which is held in the user's hand and equipped with a touchscreen for receiving user input). The big screen provides a large screen whose entire screen real estate can be devoted to playing the video, while the user can enjoy the video from a distance and interact with the control panel from his or her tablet. This enhances the overall user experience by distributing different elements of the GUI.

Commercial AR glasses such as Microsoft™ HoloLens™ use extended screens to replicate a conventional, unified GUI of the type used by a conventional 2D display, such as a GUI used by a laptop of desktop PC. Multiple virtual screens may be displayed within the 3D virtual space around the user, each such virtual screen behaving analogously to a computer monitor in a multi-monitor hardware configuration of a desktop computer. Thus, three rectangular virtual screens may be presented to the user in the virtual AR environment, each virtual screen showing one or more windows or icons as they would be displayed in an extended desktop shown over three hardware monitors arranged on a table or desk. However, when there are multiple extended screens spatially placed around the user's body, the interaction can become difficult. The spatial environment around the user's body becomes cluttered as virtual screens are added. When there are multiple instances of a single software application being presented to the user at the same time, then the collection of virtual screens will exhibit an unnecessary repetition of some GUI elements. For example, if there are two instances of Microsoft™ PowerPoint™ being presented to the user, then both instances will display the same top menu bar. Moreover, when there are multiple virtual screens arranged spatially around the body, the limited field of view of a typical AR-HMD device forces the user to make greater head and/or eye movements across the collection of virtual screens to switch visual attention from one GUI element to another, and these movements are greater the more duplication of visual elements exists among the collection of virtual screens.

Some efforts have been made to avoid the problem of duplicative content in extended screens using DUI, but these have typically been ad-hoc and specific to the individual software applications being displayed. Some approaches supplement the content shown on a physical 2D display, such as a smart watch display, by presenting a second, virtual screen in proximity to the physical 2D display, showing additional visual content that supplements the conventional GUI elements displayed on the physical 2D display. Other approaches alternate between using a smartphone's physical 2D display for visual output and user input by displacing the visual output to a virtual display while the smartphone touchscreen is being used to capture user input. However, these existing approaches require any given software application to be programmed to customized its GUI behavior when used with a specific type of physical 2D display and an AR-HMD device.

There thus exists a need for extended screen techniques for AR-HMD that overcome one or more of the limitations of existing approaches described above.

SUMMARY

The present disclosure describes devices, methods, systems, and media for providing an extended screen distributed user interface in an augmented reality environment. Example embodiments described herein process layout information for laying out a conventional 2D GUI in order to generate an extended screen DUI for display partially on a 2D display device and partially on one or more virtual screens of an AR environment viewed using an AR display device, such as a HMD. The GUI elements of a conventional 2D GUI may be organized into a directed acyclic graph (DAG) based on the spatial dependencies between the GUI elements; the vertices of the DAG may then be sorted to organize the GUI elements into subsets for populating the various DUI screens, and to position each virtual DUI screen relative to the 2D display device in the virtual environment. GUI elements may also be sorted based on a primary modality of the GUI element (input or output), and GUI elements having a primarily input modality may be displayed on the 2D display device.

In some embodiments, focus may be switched between two software application instances, one being displayed on the 2D display device and another being displayed as a virtual screen. When a user's attention is directed to the second software application instance displayed on the virtual screen, the DUI screen displayed on the virtual screen and the DUI screen displayed on the 2D display device may be swapped. One or more additional virtual screens may also have their contents updated to match GUI content of the second software application instance.

In some embodiments, the DUI is concise in scale compared to a unified GUI, as only some subsets of the GUI elements of the unified GUI are displayed in the DUI. This concision may be well-suited to the limited field-of-view of most AR-HMD devices. Consequently, the user may be able to view more extended screens within the same limited field-of-view.

In the present disclosure, the term "AR" refers to "augmented reality", which includes mixed reality (MR) for the purposes of this disclosure. As used herein, AR refers to the presentation of a virtual 3D visual environment to a user through an XR display, while also enabling the user to view at least some elements of the user's physical environment. An AR display is typically an immersive stereoscopic display capable of simulating the effects of binocular vision in a 3D environment, such as a binocular head-mounted display (HMD), but in some examples may be a monoscopic display such as a conventional 2D display screen capable of rendering 3D environments by projecting them onto two dimensions.

In the present disclosure, the term "AR-HMD" refers to any augmented reality or mixed reality technology using a head-mounted display (HMD). The term "AR-HMD device" refers to a device or system that includes a HMD and is configured to present an AR environment to a user via the HMD.

In the present disclosure, the terms "virtual space", "virtual 3D space", "virtual environment", and "virtual 3D environment" may be used interchangeably to mean a three-dimensional virtual space, containing virtual objects, generated by a computing device and visually presented to a user via an AR display. The virtual objects within the virtual environment are typically visually presented to the user so as to simulate viewing the object as though it were an actual physical object located at an actual physical distance from the user's point of view, with an orientation and relationship to other virtual and/or real objects that simulates the presence of the virtual object within a physical environment. In the case of AR or MR, the user may be presented with a combination of the virtual objects of the virtual environment and real objects of the user's physical environment, with the virtual environment being "overlaid" over the physical environment such that the virtual objects appear to be present within the physical environment.

In the present disclosure, the terms "virtual location" and "virtual size" refer to the representation of a virtual object within a virtual environment with respect to its apparent location and size, respectively, relative to the user's point of view and to other virtual or physical objects. The "physical location" or "actual location" of a physical object in the user's environment refers to the actual physical location of the object relative to the user and to other physical objects in the user's physical environment. In AR or MR, virtual locations are typically defined in relation to physical locations. The term "location" may refer to a virtual location in the context of virtual objects, and may refer to a physical location in the context of physical objects. In the case of physical objects represented in a virtual environment by an avatar (i.e. a virtual object laid over or anchored to a physical object), the "location" of the object may refer to either the physical location of the physical object or the virtual location of the corresponding avatar. The "virtual size" of a virtual object remains constant even as its apparent size increases or decreases based on the distance of its virtual location from the user.

In the present disclosure, the term "virtual object" may refer to any representation by a computing system of a phenomenon situated in a virtual environment at a virtual location such that a visually perceptible or otherwise perceptible stimulus is presented to a user as though the stimulus originated at the virtual location. Typically, virtual objects are visually presented to a user as 2D or 3D objects located within the 3D virtual environment. Virtual objects may include representations of real-world 3D objects (such as a 3D rendering of an airplane), 2D displays (such as a 2D rectangular screen showing a film being played), 2D sprites (such as a 2D button that can be pressed), or 3D sprites (such as a 3D slider for controlling audio volume).

In the present disclosure, the term "GUI" refers to a graphical user interface, which is a form of user interface that allows users to interact with electronic devices through graphical icons. The term "GUI element" refers to an icon or other visual element of a GUI, some of which may indicate a screen area responsive to user input, e.g. tapping or clicking with a finger or pointing device, to effect some particular function of the electronic device. The term "GUI screen" refers to a collection of GUI elements laid out in a fixed relation to one another within a 2D area, such as a rectangular area corresponding to the display surface of a display device. The term "DUI" refers to a "distributed user interface", which is a GUI consisting of multiple GUI screens or GUI elements intended to be simultaneously displayed on multiple physical or virtual surfaces of a virtual environment. Unless otherwise specified, "GUI" refers herein to a conventional GUI configured for display on a conventional 2D display, whereas "DUI" refers herein to a collection of GUI elements presented at least in part as virtual objects in an AR environment.

In the present disclosure, a "view" of an AR environment refers to the portion of an AR environment rendered and displayed on an AR display device at a given point in time, corresponding to the field of view of a user wearing the AR display device. The pixels displayed in one view are a function of the contents of the AR environment, the position of the AR display device within the AR environment, the orientation of the AR device relative to the AR environment, and the shape of the field of view of the AR display device.

In the present disclosure, the term "display device" refers an electronic display configured to display visual information, such as an LED, LCD, or CRT monitor, either alone or in combination with other hardware and/or software components used to compute, render, and/or display information on the display. Thus, for example, each of the following may be considered a display device: a smartphone with an LED display; the LED display in combination with a GPU and display driver of the smartphone; and the LED display by itself.

In the present disclosure, the term "location" refers to a location of a physical object or virtual object. "Linear position" may refer to the position of an object with respect to 3 linear dimensions (x, y, z), and "angular position" may refer to the position of an object with respect to 3 angular dimensions (roll, pitch, and yaw).

In the present disclosure, the term "software application" refers to a software program running on a computing device: i.e., a software program that has been loaded into memory such that one or more instances of the software program may be executed by a processor. A "software application instance" refers to an instance of a software application, such as a process or window presenting a self-contained view of the software application's GUI to the user. For example, a computing device that has loaded three Microsoft Word™ word processing documents into its memory, thereby potentially presenting a user with a view of the three documents in three separate windows, may be said to be running three instances (i.e. the three windows or GUIs) of one software application (i.e. the software program Microsoft Word™).

In the present disclosure, the term "subset" refers to one or more elements of a set consisting of a plurality of elements. Two distinct subsets of a single set may include zero or more elements in common.

In some aspects, the present disclosure describes a method for displaying a distributed user interface (DUI). Graphical user interface (GUI) information is obtained, comprising GUI element information for each of a plurality of GUI elements, and GUI layout information for arranging the plurality of GUI elements for presentation as a GUI screen on a two-dimensional (2D) display. The GUI layout information is processed to identify a first subset of the plurality of GUI elements for display on a primary DUI screen, and a second subset of the plurality of GUI elements for display on a secondary DUI screen. A primary DUI screen is generated, comprising the GUI element information for each GUI element of the first subset. A secondary DUI screen is generated, comprising the GUI element information for each GUI element of the second subset. The primary DUI screen is displayed on a 2D display device. The secondary DUI screen is displayed on an augmented reality (AR) display device.

In some aspects, the present disclosure describes a system for displaying a distributed user interface (DUI). The system comprises a 2D display device, an augmented reality (AR) display device, a processor device, and a memory. The memory stores machine-executable instructions thereon which, when executed by the processing device, cause the system to perform a number of operations. Graphical user interface (GUI) information is obtained, comprising GUI element information for each of a plurality of GUI elements, and GUI layout information for arranging the plurality of GUI elements for presentation as a GUI screen on a two-dimensional (2D) display. The GUI layout information is processed to identify a first subset of the plurality of GUI elements for display on a primary DUI screen, and a second subset of the plurality of GUI elements for display on a secondary DUI screen. A primary DUI screen is generated, comprising the GUI element information for each GUI element of the first subset. A secondary DUI screen is generated, comprising the GUI element information for each GUI element of the second subset. The primary DUI screen is displayed on a 2D display device. The secondary DUI screen is displayed on an augmented reality (AR) display device.

By providing a method to modularize a unified GUI based on the semantic structure of a software application, modularized GUIs may be provided which are moveable and distributable across a physical display and virtual locations of an AR environment displayed by an AR display while following the semantic structure of the software application. Thus, a unified GUI may be automatically modularized based on a pre-existing semantic structure used to display the unified GUI on a conventional 2D display.

In some examples, displaying the secondary DUI screen on the AR display device comprises obtaining 2D display device location information indicating a location of the 2D display device, processing the 2D display device location information to generate secondary DUI screen location information indicating a secondary DUI screen virtual location, and displaying a view of an AR environment on the AR display device. The AR environment includes the secondary DUI screen located at the secondary DUI screen virtual location.

In some examples, processing the 2D display device location information to generate secondary DUI screen location information comprises: obtaining DUI layout information indicating a fixed spatial relationship between the location of the 2D display device and the secondary DUI screen virtual location, and determining the secondary DUI screen virtual location based on the location of the 2D display device and the fixed spatial relationship.

In some examples, the fixed spatial relationship comprises: an angular position of the secondary DUI screen such that the secondary DUI screen is displayed substantially co-planar with the 2D display device, and a linear position of the secondary DUI screen such that the secondary DUI screen is displayed proximate to, and non-overlapping with, the 2D display device.

In some examples, displaying the view of the AR environment on the AR display device comprises: obtaining 2D display device display surface area information indicating a display surface area of the 2D display device, processing the 2D display device display surface area information to generate secondary DUI screen virtual size information, and displaying the view of an AR environment on the AR display device such that the secondary DUI screen is displayed with a virtual size indicated by the secondary DUI screen virtual size information.

By calculating the relative position of a DUI screen with respect to other DUI screens in the same virtual space, and preserving the semantic structure of the unified GUI when laying out the DUI screens across a physical display and an AR display, the user's spatial memory may assist in recalling the spatial location of a GUI module within the unified GUI.

In some examples, the method further comprises: processing the GUI layout information to identify one or more additional subsets of the plurality of GUI elements for display on one or more respective additional DUI screens, generating one or more additional DUI screens, and displaying the one or more additional DUI screens on the AR display device. Each additional DUI screen comprises the GUI element information for each GUI element of one of the one or more additional subsets.

In some examples, displaying the one or more additional DUI screens on the AR display device comprises additional operations. 2D display device location information is obtained, indicating a location of the 2D display device. DUI layout information is obtained, indicating: a first fixed spatial relationship between the location of the 2D display device and the secondary DUI screen virtual location, and for each additional DUI screen, an additional fixed spatial relationship between the location of the 2D display device and the respective additional DUI screen virtual location. A secondary DUI screen virtual location is determined based on the location of the 2D display device and the first fixed spatial relationship. For each additional DUI screen, an additional DUI screen virtual location is determined based on the location of the 2D display device and the respective additional fixed spatial relationship. A view of an AR environment is displayed on the AR display device, the AR environment including: the secondary DUI screen located at the secondary DUI screen virtual location, and the one or more additional DUI screens. Each additional DUI screen is located at its respective additional DUI screen virtual location.

In some examples, obtaining the DUI layout information comprises: processing the GUI layout information to generate a plurality of constraints, each constraint defining a vertical dependency or a horizontal dependency between two GUI modules, each GUI module comprising one or more GUI elements of the plurality of GUI elements, generating a directed acyclic graph (DAG) wherein: each GUI module corresponds to a vertex, and each constraint corresponds to an edge, topologically sorting the vertices of the DAG based on the vertical dependencies of the DAG and the horizontal dependencies of the DAG to generate a sorted order of the vertices, and generating the first fixed spatial relationship and each additional fixed spatial relationship based on the sorted order of the vertices.

In some examples, the GUI layout information comprises one or more layout definition files, each layout file comprising one or more semantic tags.

In some examples, processing the GUI layout information to identify the first subset and second subset comprises: processing the GUI layout information to identify a primary modality of each of a plurality of GUI modules wherein each GUI module comprises a subset of the plurality of GUI elements, identifying the second subset of the plurality of GUI elements as a GUI module having a primary modality of output, and identifying the first subset of the plurality of GUI elements as a GUI module having a primary modality of input.

By distributing GUI modules to DUI screens based on interaction modalities, the DUI screens may be positioned to a best fit virtual space based on an interaction modality of the GUI modules of the DUI screen.

In some examples, the GUI information comprises GUI information for a first software application instance, and GUI information for a second software application instance. The primary DUI screen comprises a first DUI screen of the first software application instance. The secondary DUI screen comprises a first DUI screen of the second software application instance. The one or more additional DUI screens comprise additional DUI screens of the first software application instance. The method further comprises: processing user input information to detect user attention directed to the secondary DUI screen, displaying the secondary DUI screen on the 2D display device, and displaying a view of the AR environment on the AR display device. The AR environment includes the primary DUI screen located at the secondary DUI screen virtual location.

In some examples, the method further comprises: processing the GUI layout information to identify a further subset of the plurality of GUI elements, and generating a further DUI screen comprising the GUI element information for each GUI element of the further subset. The AR environment further includes the further DUI screen located at one of the additional DUI screen virtual locations.

By providing a method to dynamically change the content displayed at a DUI placeholder location when a user indicates a desire to switch focus to another software application instance, the system may re-use the DUI screen placeholder locations in the virtual environment by simply changing the content of a DUI screen when another software application instance has the focus. By reusing DUI screen locations, the user may experience reduced display clutter in the DUI layout.

In some aspects, the present disclosure describes a processor-readable medium having instructions tangibly stored thereon. The instructions, when executed by a processor device, cause the processor device to perform a number of operations. Graphical user interface (GUI) information is obtained, comprising GUI element information for each of a plurality of GUI elements, and GUI layout information for arranging the plurality of GUI elements for presentation as a GUI screen on a two-dimensional (2D) display. The GUI layout information is processed to identify a first subset of the plurality of GUI elements for display on a primary DUI screen, and a second subset of the plurality of GUI elements for display on a secondary DUI screen. A primary DUI screen is generated, comprising the GUI element information for each GUI element of the first subset. A secondary DUI screen is generated, comprising the GUI element information for each GUI element of the second subset. The primary DUI screen is displayed on a 2D display device. The secondary DUI screen is displayed on an augmented reality (AR) display device.

In some aspects, the present disclosure describes a processor-readable medium having instructions tangibly stored thereon. The instructions, when executed by a processor device, cause the processor device to perform the steps of any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes example devices, methods, systems, and media for displaying a DUI and for switching DUI focus between two software application instances.

Example Devices and Systems

For simplicity, the present disclosure describes examples in the context of a system comprising a computing device, a 2D display device (such as a smartphone, smart watch, or laptop computer), and an AR display device (e.g., a head mounted display (HMD) unit enabling stereoscopic presentation of the virtual 3D environment to a user's eyes), wherein the HMD unit contains an inertial measurement unit (IMU) for tracking movements of the user's head. However, it should be understood that the present disclosure is not limited to such embodiments, and the devices, methods, systems, and media described herein may be implemented in a number of different systems including different sensors to track the user's head, different sensors to obtain user input other than head tracking information, different AR display types, different 2D display device types, and/or different configurations of computing devices or platforms to perform the calculation, communication, data storage, and data retrieval operations described herein. For example, in some embodiments the computing device performing the operations described herein may be the 2D display device (e.g., a smartphone or laptop computer) or the AR display device (e.g. the HMD unit).

Figure 1:
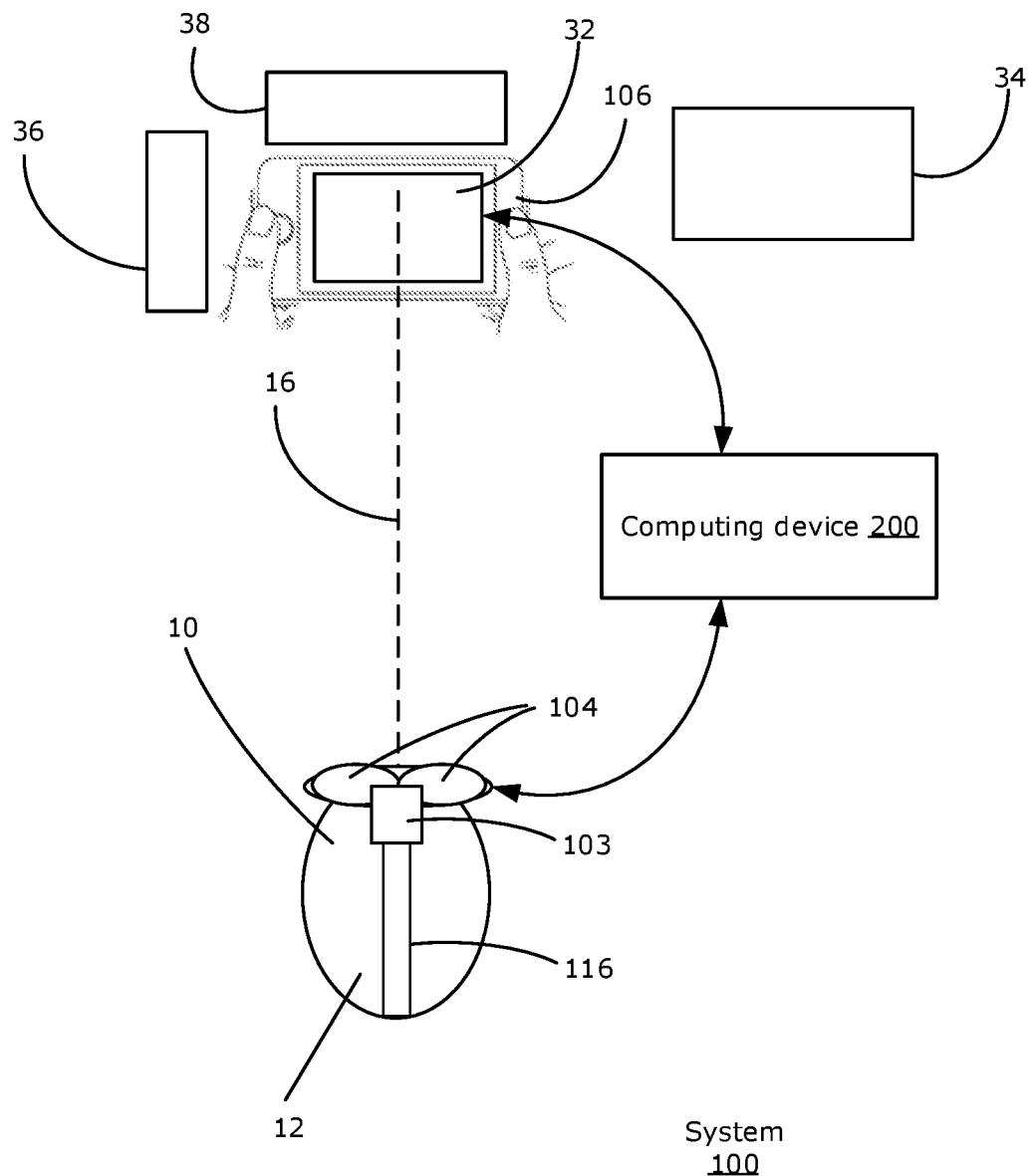
FIG. 1 is a top view of a user interacting with a system for displaying a distributed user interface (DUI), in accordance with examples described herein.

FIG. 1 shows an example of a user interacting with a system 100 for selecting virtual objects for user interaction in an augmented reality environment. In this simplified diagram, the system 100 includes a computing device 200 in communication (e.g., via wired or wireless data connections such as 802.11 or Bluetooth™) with a head-mounted display (HMD) unit 116 worn on the user's head 10. The HMD unit 116 includes an AR display device 104, shown as a stereoscopic AR display, for presenting a virtual 3D environment to the user's eyes while also displaying or permitting the user to directly view the user's physical environment. The HMD unit 116 also includes a forward-facing camera 103 used to capture the user's field of view to assist in generation of the virtual content of the AR environment and integration with the user's physical environment. In this example, the HMD unit 116 includes an head mounted IMU 112 configured to generate, and communicate to the computing unit 200, head movement information indicating a linear velocity and an angular velocity of the head, such as three dimensions of linear acceleration (x, y, z) detected by an accelerometer of the IMU and three dimensions of angular acceleration (roll, pitch, yaw) detected by a gyroscope of the IMU. In other embodiments, an IMU may be coupled to the user's head 10 using means other than the HMD unit 116. In other embodiments, other user input sensors may be included in the system 100 in addition to, or instead of, the IMU, for the purpose of providing the head movement information and/or other user input of various types. The other user input sensors may include, in various embodiments, infrared (IR) cameras, red/green/blue (RGB) cameras, other conventional digital cameras, motion sensors, and/or any other sensor type that may enable tracking of head movement and/or orientation, user hand gestures, user gaze direction, or other indicia of a direction of the user's visual attention. The other user input sensors may also include conventional user input devices, such as handheld AR controllers, pointing devices, keyboards, etc. In some embodiments, the other user input sensors may be used to supplement the data from the IMU to provide better accuracy in tracking head movements.

In FIG. 1, the IMU and/or other user input sensors are used to track movement of the head 10. The head 10 is shown in a first position 12, indicated by a first location and angular orientation of the HMD unit 116. The direction of view of the head 10 in the first position 12 is shown as first view direction 16. The view direction 16 may be used to determine the view of the AR environment to be generated and displayed on the AR display device 104.

It will be appreciated that the first position 12 of the head 10 is shown in FIG. 1 in two dimensions and without showing the angular orientation of the head 10; however, example embodiments may track the linear movement of the head 10 in three dimensions and the angular changes in head orientation in three dimensions, thereby resulting in six-dimensional movement tracking for the head 10.

Held in the user's hands is a 2D display device 106, shown in FIG. 1 as a smartphone. The view of the AR environment displayed on the display of the HMD unit 116 in FIG. 1 will show the physical and virtual environment around the 2D display device 106, which is located approximately at the center of the user's field of view, as indicated by first view direction 16. Examples described herein display a DUI to the user using a combination of the 2D display device 106 and the AR display device 104. The DUI shown in FIG. 1 includes several DUI screens: a primary DUI screen displayed on the 2D display device 106 at a primary DUI screen location 32, a secondary DUI screen displayed on the AR display device 104 as part of the view of the AR environment at a secondary DUI screen virtual location 34, and two additional DUI screens displayed on the AR display device 104 as part of the view of the AR environment at a first additional DUI screen virtual location 36 and second additional DUI screen virtual location 38, respectively. In some examples, the first additional DUI screen virtual location 36 may be used to display a sidebar DUI screen and may be referred to as a "sidebar DUI virtual location", and the second additional DUI screen virtual location 38 may be used to display a header DUI screen and may be referred to as a "header DUI virtual location".

As shown in FIG. 1, the 2D display device 106 and the HMD unit 116 are in communication with a computing device 200. The computing device 200 performs the various operations for generating and displaying the DUI on the 2D display device 106 and the AR display unit 104, as described in greater detail below with reference to FIG. 2. In some embodiments, the HMD unit 116 and 2D display device 106 are each equipped with computing hardware such as a processor and memory distinct from those of the computing device 200; in other embodiments, the computing device 200 may be the HMD unit 116 or 2D display device 106, or the system 100 may contain more than one computing device 200. It will be appreciated that various combinations of functions of the HMD unit 116, the 2D display device 106, and the computing device 200 may be performed by different devices or different parts of a distributed computing system in various embodiments.

Figure 2:
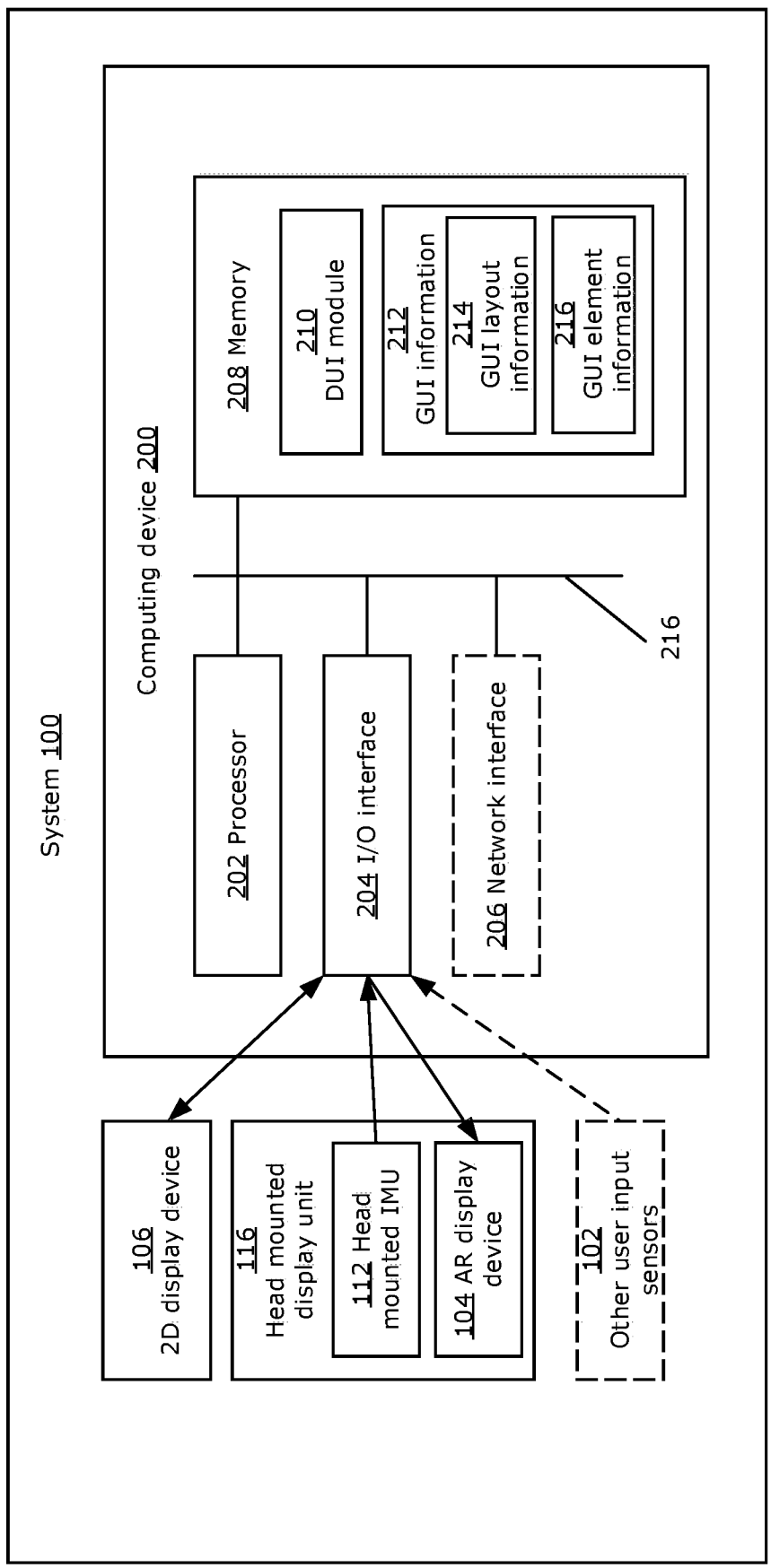
FIG. 2 is a block diagram illustrating some components of an example system for displaying a DUI, in accordance with examples described herein.

FIG. 2 is a block diagram of the computing device 200. Although an example embodiment of the computing device 200 is shown and discussed below, other embodiments may be used to implement examples disclosed herein, which may include components different from those shown. Although FIG. 2 shows a single instance of each component of the computing device 200, there may be multiple instances of each component shown.

The computing device 200 includes one or more processors, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors may collectively be referred to as a "processor device" or simply a processor 202. The computing device 200 also includes one or more input/output (I/O) interfaces, collectively referred to as I/O interface 204, which interfaces with input devices such as the 2D display device 106 (which may include user input components such as a touchscreen), the head mounted IMU 112, and optionally (as shown by dashed lines) the other user input sensors 102. The input/output (I/O) interface 204 also interfaces with output devices such as the 2D display device 106 and the AR display device 104 of the HMD unit 116. The computing device 200 may also interface with other input devices (e.g., buttons, microphone, touchscreen, keyboard, etc.) and other output devices (e.g., speaker, vibration unit, etc.) included in the system 100.

The computing device 200 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications. In some embodiments, one or more network interfaces 206 may be used as, or instead of, the I/O interface 204 for communication with one or more of the input devices and/or output devices described above, for example using 802.11 or Bluetooth™ wireless communication.

The computing device 200 includes one or more memories, collectively referred to as memory 208, which may include a volatile or non-volatile memory (e.g., a flash memory, a random access memory (RAM), and/or a read-only memory (ROM)). The non-transitory memory 208 may store machine-executable instructions for execution by the processor 202, such as to carry out examples described in the present disclosure. A set of machine-executable instructions defining a DUI module 210 is shown stored in the memory 208, which may be executed by the processor 202 to perform the steps of the methods described herein. The operation of the system 100 in executing the DUI module 210 is described below with reference to FIG. 3. The DUI module 210 includes machine-executable instructions that are executable by the processor 202 to perform the functions of each submodule 310, 320, 330, 340 thereof. The memory 208 may include other software instructions, such as for implementing an operating system and other applications or functions.

The memory 208 may also store GUI information 212 for one or more software application instances. In some examples, the GUI information 212 includes information used to display a GUI for each software application instance running on the computing device 202. As described herein, each software application instance has its own GUI information 212; however, it will be appreciated that in some examples multiple instances of a single software application, or even multiple separate software applications, may share some portions of their GUI information 212.

The GUI information 212 for a given software application instance in includes GUI layout information 214 and GUI element information 216. The GUI element information 216 includes information for each of a plurality of GUI elements: e.g., text data, bitmap data, and/or other information used to display the GUI element and enable behaviors of the GUI element such as animation and interactivity. The GUI layout information 214 includes information used for arranging the plurality of GUI elements for presentation as a GUI screen on a 2D display. In some embodiments, the GUI layout information may include one or more layout definition files. Each layout file may include one or more semantic tags. The use of the GUI information 212 by the DUI module 210 to display the DUI is described in greater detail below with reference to FIGS. 3-9.

In some examples, the computing device 200 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computing device 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The components of the computing device 200 may communicate with each other via various means, such as a data bus 216. In some embodiments, the operations of the computing device 200 may not performed by a distributed computing system, such as a cloud computing system or a virtual machine instance implemented over one or more servers.

Example DUI Module

Figure 3:
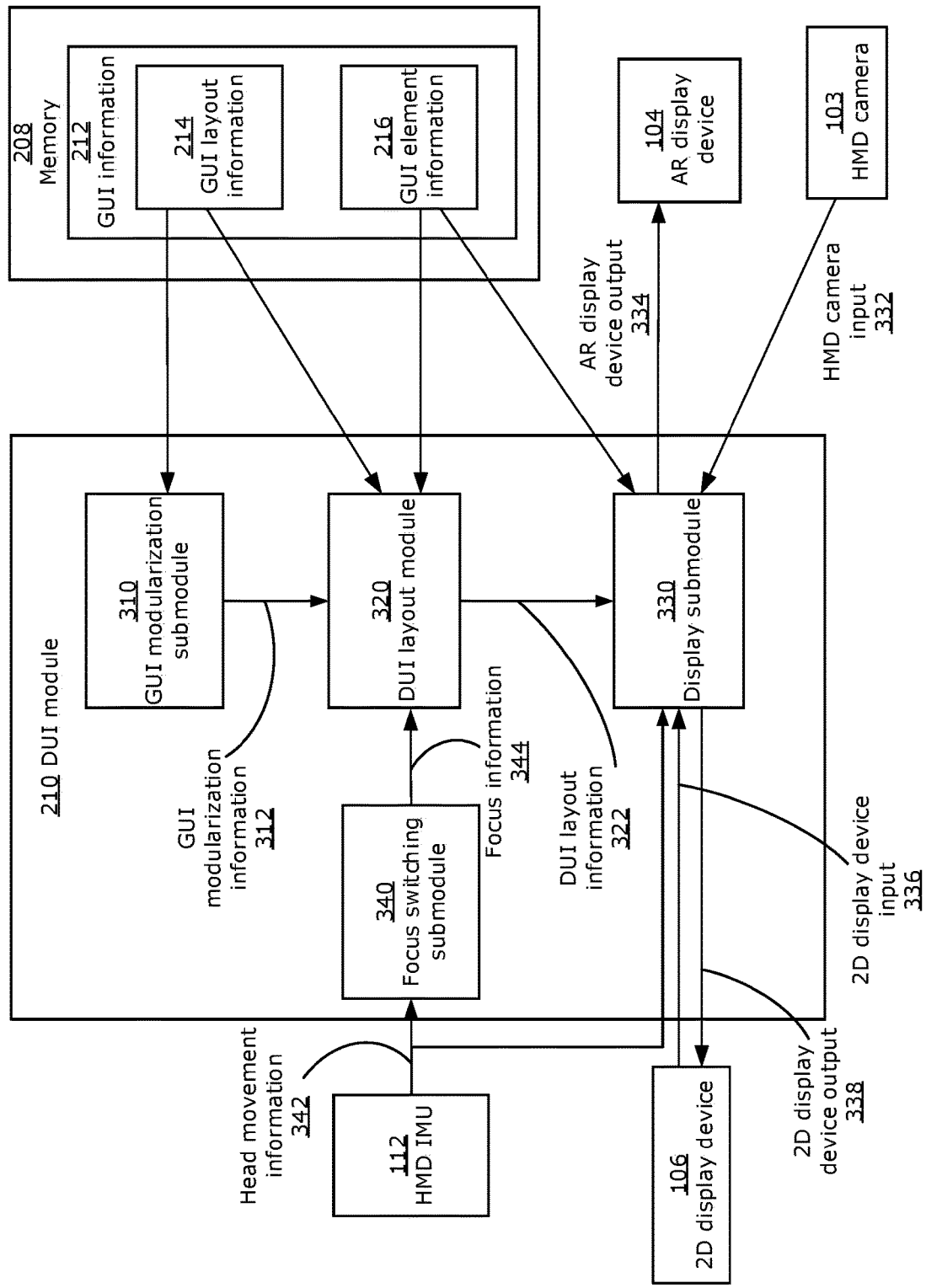
FIG. 3 is a block diagram illustrating the inputs and outputs of various submodules of an example DUI module of the computing device of FIG. 2.

FIG. 3 illustrates an example DUI module 210 executed by the computing device 200. In this example, the DUI module 210 is shown consisting of four submodules: a GUI modularization submodule 310, a DUI layout submodule 320, a display submodule 330, and a focus switching submodule 340. Whereas the DUI module 210 is described herein as implemented by machine-executable instructions executed by the processor 202 of the computing device 200, in some embodiments one or more operations of the DUI module 210 may be performed by specialized hardware (such as an application-specific integrated circuit (ASIC)) or by a separate computing device or platform within the system 100.

The GUI modularization submodule 310 processes GUI layout information 214 to modularize the GUI, thereby generating GUI modularization information 312. The DUI layout submodule 320 generates DUI layout information 316, indicating a layout of GUI elements for display on the 2D display device 106 and on virtual DUI screens in virtual locations of the AR environment, by processing the GUI modularization information 314 and, in some examples, by processing the GUI layout information 322, the GUI element information 216, and/or focus information 344 received from the focus switching submodule 340. The display submodule 330 uses the GUI layout information 214 to display a DUI screen on the 2D display device 106, sent to the 2D display device 106 as 2D display device output 338. The display submodule 330 also receives 2D display device input 336, such as information indicating a size and/or location of the 2D display device 106, and uses this information to generate an AR display output 334 comprising a view of the AR environment that includes one or more DUI screens located and sized based on the 2D display location and size. In some examples, the location and/or size of the 2D display device 106 may be determined based on HMD camera input 332, such as image data captured by the HMD camera 103, and/or head movement information 342 from the HMD IMU 112. The focus switching submodule 340 processes user input, such as head movement information 342 from the HMD IMU 112 indicating a direction of the user's gaze, to generate focus information 344 indicating the user's current focus. The DUI layout module 320 may use the focus information 344 to determine whether to switch the current DUI focus from one software application instance to another software application instance and therefore reconfigure the DUI layout.

The operations, functional blocks, inputs, and outputs shown in FIG. 3 will be described in detail in the context of an example method 400 for displaying a DUI, illustrated in the flowcharts of FIGS. 4-7.

Example Methods for Displaying a DUI

Figure 4:
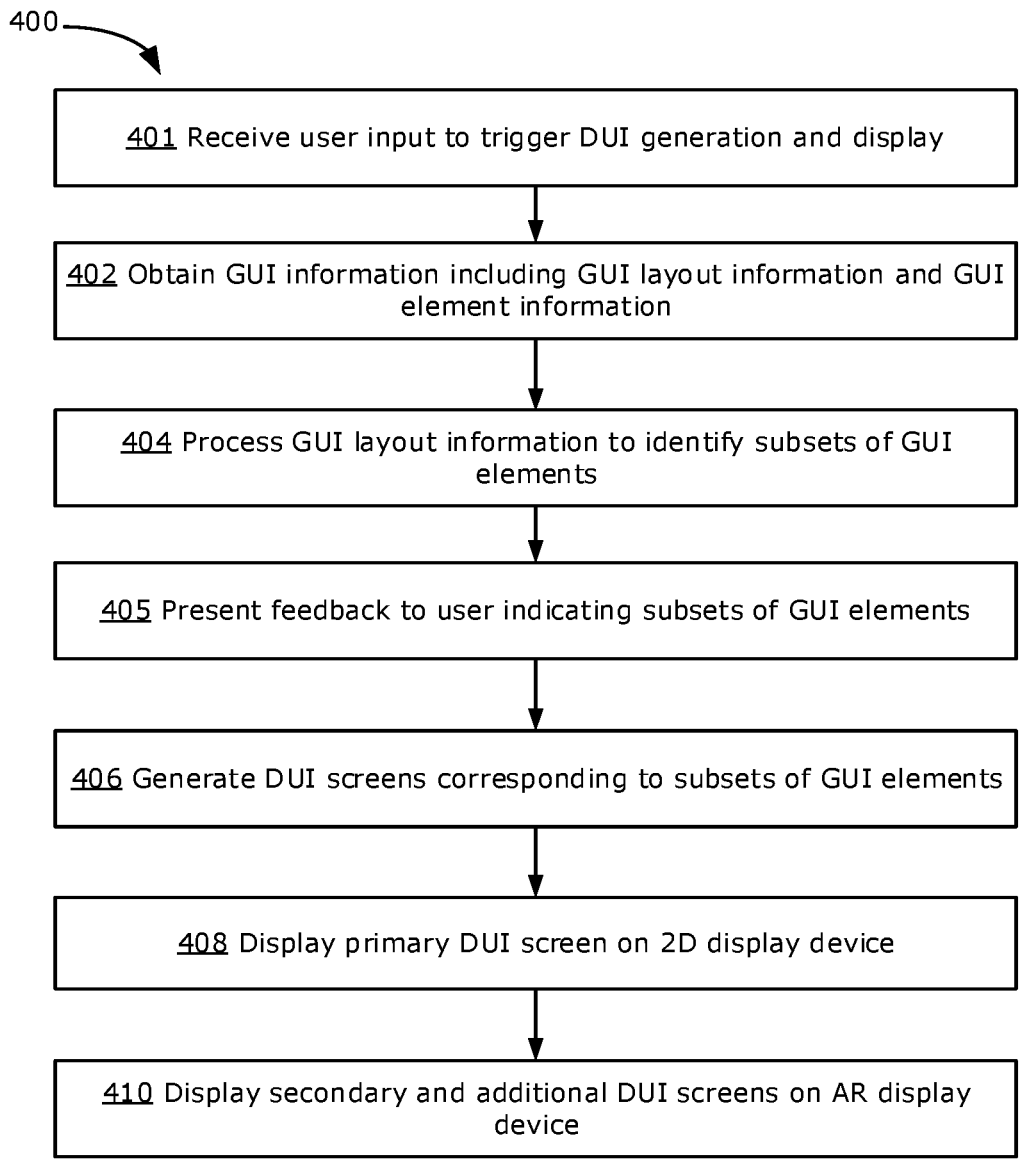
FIG. 4 is a flowchart illustrating an example method for displaying a DUI that may be performed by the DUI module of FIG. 3.

FIG. 4 is a flowchart showing steps of an example method 400 for displaying a DUI. In the example embodiments described below, the method 400 is performed by the DUI module 210 as part of the system 100. However, it will be appreciated that other embodiments may practice the steps of method 400 using other components that perform similar functions.

Prior to performing method 400, the computing device 200 may have one or more software applications loaded into the memory 208, such that one or more instances of each software application are executed by the processor 202. The instances of each software application may be presented to the user through a unified GUI displayed on the 2D display device 106. The unified GUI may be defined by the GUI information 212. At any given time, the unified GUI may display one or more GUI elements of one or more of the software application instances on the display of the 2D display device 106, while other GUI elements of the software application instances may not be displayed because they are running in the background or occluded by the displayed GUI elements. Examples of unified GUI layouts are shown in FIG. 10A and FIG. 10C. FIG. 10A shows a unified GUI 1002 displaying four GUI modules: GUI module A 1022, GUI module B 1024, GUI module C 1026, and GUI module D 1028. Each GUI module 1022, 1024, 1026, 1028 includes a subset of one or more GUI elements of the plurality of GUI elements of the GUI element information 216 stored in the memory 208 of the computing device 200. In FIG. 10A, each GUI module 1022, 1024, 1026, 1028 is displayed on the 2D display device 106 in a non-overlapping layout with the other GUI modules. For example, an instance of a word processing software application may display the unified GUI 1002 wherein GUI module A 1022 is a content panel showing the content of a document being edited; GUI module B 1024 is a header panel showing a ribbon of interactive menu icons; GUI module C 1026 is a navigation panel showing interactive thumbnails or bookmarks for navigating within the document; and GUI module D 1028 is a footer panel showing document metadata (e.g. word count), alerts, and/or further interactive menu icons.

FIG. 10C shows a unified GUI 1006 displaying three GUI modules: GUI module E 1030, GUI module F 1032, and GUI module G 1034. Each GUI module 1030, 1032, 1034 includes a subset of one or more GUI elements of the plurality of GUI elements of the GUI element information 216 stored in the memory 208 of the computing device 200. In FIG. 10C, the GUI modules 1030, 1032, 1034 is displayed on the 2D display device 106 in an overlapping layout such that GUI module F 1032 and GUI module G 1034 are displayed in front of GUI module E 1030. For example, an instance of a video playback software application may display the unified GUI 1006 wherein GUI module E 1030 is a video content panel showing the video content being played; GUI module F 1032 is a playback control panel showing a ribbon of interactive menu icons (e.g. icon buttons for playing/pausing the video, for rewinding the video, and for advancing the video); GUI module G 1034 is a progress bar panel showing a progress bar indicating the current video playback position and/or allowing a user to interactively scrub backward or forward within the video. In some examples, GUI module F 1032 and/or GUI module G 1034 may include some transparent or partially transparent portions to enable a user to view portions of the video content of GUI module E 1030 that would otherwise be occluded.

The method 400 begins at operation 401. At 401, the computing system 200 may receive user input indicating the user's desire to trigger generation and display of the DUI. The user input triggering the DUI generation and display can be a physical button tap, touchscreen tap, gesture, voice command, or any other user input. The user input may be received by the 2D display device 106 or HMD unit 116 and communicated to the computing device 200 via the I/O interface 204 or network interface 206, or could be directly received by the computing device through the I/O interface 204, e.g. from one of the other user input sensors 102.

At 402, the computing device 200 obtains the GUI information 212 from the memory 208. The GUI information 212 includes GUI element information 216 for each of a plurality of GUI elements, and GUI layout information 214 for arranging the plurality of GUI elements for presentation as a GUI screen on a 2D display (e.g., as shown in the unified GUIs 1002, 1006 of FIGS. 10A and 10C).

In some embodiments, the GUI modularization submodule 310 may obtain the GUI layout information 214 by detecting embedded semantic tags of the unified GUI, including GUI information for one or more software application instances loaded into the memory 208. Each software application instance may group its GUI elements into one or more GUI modules, such as the GUI modules 1022, 1024, 1026, 1028, 1030, 1032, 1034 of FIGS. 10A and 10C. A GUI module is a subset of one or more GUI elements which should remain together as a functional and logical group. Thus, the term "GUI module" always refers to a subset of the GUI elements of the GUI element information 216. In some embodiments, the GUI element subsets defining the GUI modules may be identified by semantic tags, which may be any markup language definition tags. Traditional examples of markup language tags include <aside>, <article>, and other tags in HTML5 and relative layout definition in Android's XML. Inside the GUI module tags, there are key-value pairs wherein the keys are attributes. One or more attributes and their respective values may be used to define the relative position of the GUI module with respect to other GUI modules. For example, in the Android™ operating system, layout properties in a RelativeLayout include android:layout_below, which positions the top edge of the current GUI module below the GUI module specified with a resource ID as a value in this attribute. The tags may be stored in the memory 208 in one or more layout definition files. Thus, in some embodiments the GUI layout information 214 may comprise one or more layout definition files, each layout file comprising one or more semantic tags. It will be appreciated that other semantic tag types or other types of information may be used as GUI layout information 214, which may be stored as files or other data objects, such as arrays, in the memory 208.

At 404, the GUI modularization submodule 310 processes the GUI layout information 214 to identify two or more GUI modules and designate each GUI module for display on a respective DUI screen. The GUI modularization submodule 310 may use the GUI layout information 214 to identify a first GUI module, constituting a first subset of the plurality of GUI elements, for display on a primary DUI screen; a second GUI module, constituting a second subset of the plurality of GUI elements, for display on a secondary DUI screen; and optionally one or more additional GUI modules, each constituting an additional subset of the plurality of GUI elements, for display on one or more respective additional DUI screens.

In some embodiments, the GUI modularization submodule 310 performs a semantic tag parsing operation to parse the layout definition files and extract the semantic tags. If there are multiple files that define the layout of the unified GUI, then the parsing operation may run on all the files. The parsing operation searches for semantic tags: once a semantic tag is found, the parsing operation adds the tag to a list and continues to look for other semantic tags until no more semantic tags are found in the layout definition files.

Figure 6:
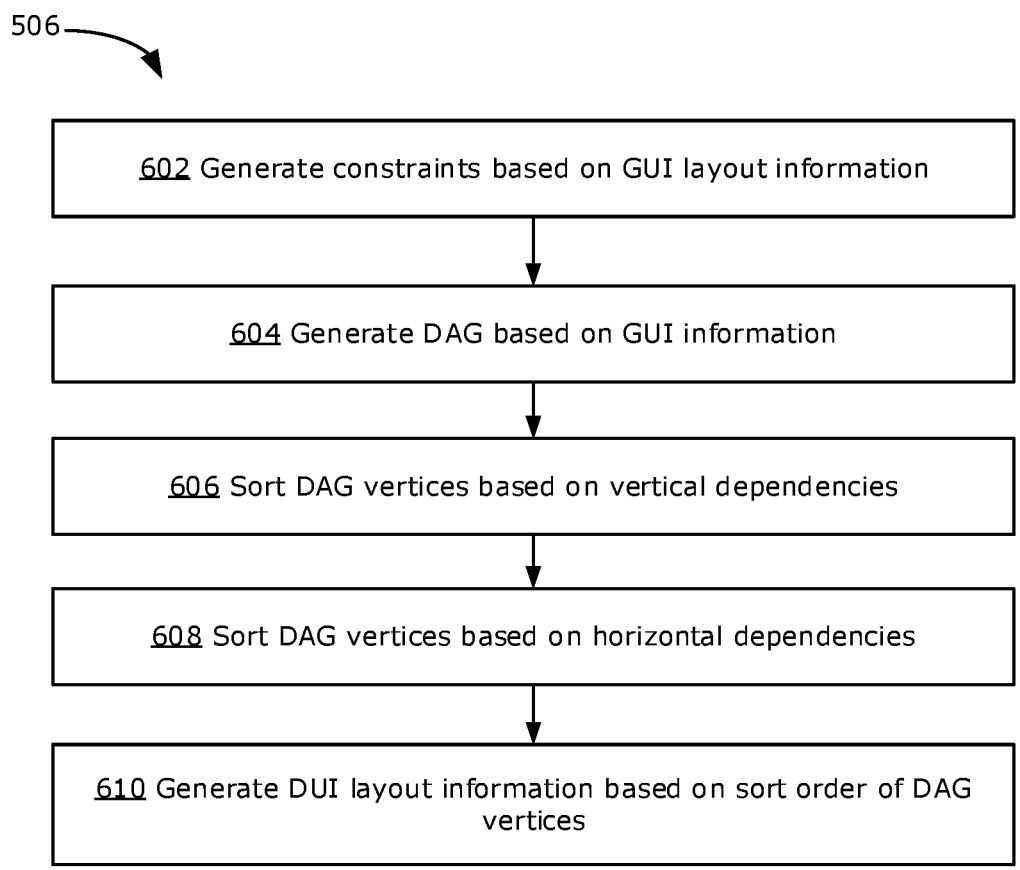
FIG. 6 is a flowchart illustrating example sub-steps of the operation of obtaining DUI layout information of the flowchart of FIG. 5.
Figure 7:
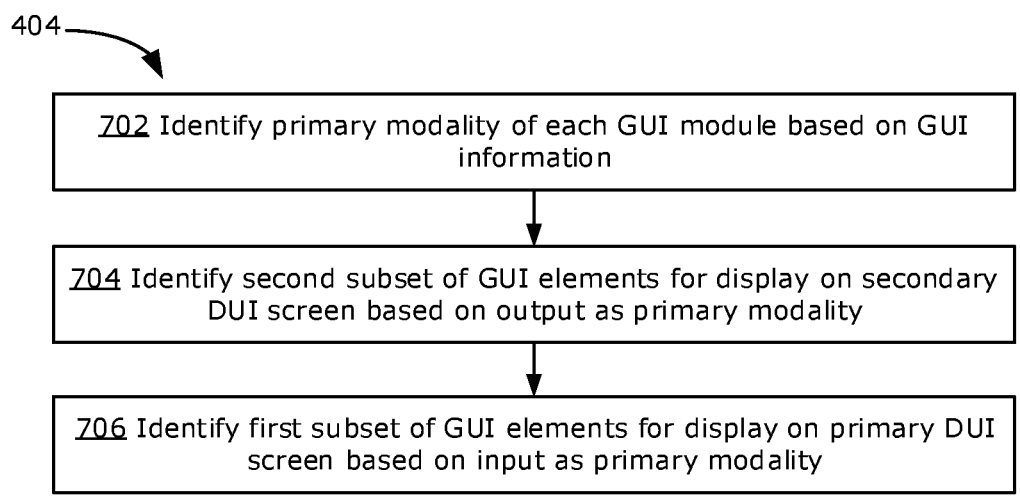
FIG. 7 is a flowchart illustrating example sub-steps of the operation of identifying GUI element subsets of the method of FIG. 4.

The list of semantic tags may then be processed to identify which GUI modules should be displayed on which DUI screens, as described in greater detail below with reference to FIGS. 6 and 7. FIG. 6 shows an example sequence of sub-steps by which GUI modules may be sorted and laid out for display on various screens of the DUI. FIG. 7 shows an example sequence of sub-steps of operation 404 by which GUI modules are designated for display on the 2D display device 106 or display on the AR display device 104 as one of the virtual screens of the DUI.

The GUI modularization submodule 310 may then generate GUI modularization information 312 identifying the two or more subsets of GUI elements (i.e. the GUI modules) extracted from the GUI layout information 214.

At 405, the computing device 200 may optionally present feedback to the user based on the GUI modularization information 312. The feedback may indicate or identify the GUI modules that are candidates for distribution and layout as part of the DUI. The feedback may include audio feedback, visual feedback, and/or other modalities of feedback. Audio feedback may include playing a tone (via speakers communicating via the I/O interface 204) that signifies that extracting the semantic tags was a success or has been completed. Visual feedback may be displayed (e.g. on the 2D display device 106 and/or the AR display device 104) as a simple confirmation message, by outlining or painting a border around the detected GUI modules (e.g. displaying a border around each of the GUI modules 1022, 1024, 1026, 1028 shown on the 2D display device 106 in FIG. 10A), or by animating (e.g., shaking or highlighting with colors in periodic intervals) the detected GUI modules. Thus, the method 400 may provide a way to the user to perceive the moveable and distributable GUI modules before the system spatially distributes the GUI modules to DUI screens within the DUI.

At 406, the DUI layout module 320 uses the GUI modularization information 312, as well as the GUI information itself (i.e. the GUI layout information 214 and/or GUI element information 216), to generate two or more DUI screens. A primary DUI screen is generated, comprising the GUI element information for each GUI element of the first subset of GUI elements (i.e. the first GUI module). A secondary DUI screen is generated, comprising the GUI element information for each GUI element of the second subset of GUI elements (i.e. the second GUI module). One or more additional DUI screens are generated, each additional DUI screen comprising the GUI element information for each GUI element of one of the one or more additional subsets of GUI elements (i.e. the additional GUI modules). Each DUI screen may include one or more of the GUI modules and/or other GUI elements of the GUI element information 216. The DUI layout module 320 lays out (i.e. arranges or positions) the GUI modules and elements within each DUI screen. A DUI screen may be rectangular in shape, or it may be another shape such as an irregular shape. DUI screens may include transparent or semi-transparent portions. DUI screens are typically flat (i.e. two-dimensional); however, in some embodiments the DUI screens displayed by the AR display device 104 may be displayed on surfaces of virtual objects that have a non-zero depth dimension, and/or may be displayed on curved or other non-flat surfaces.

The DUI layout module 320 may also determine how to distribute and position the secondary DUI screen and/or any additional DUI screens for display in the AR environment. The DUI layout module 320 generates DUI layout information 322 indicating or identifying the layout of GUI modules and elements within each DUI screen, and also indicating a DUI layout defining spatial relationships between the various DUI screens. An example set of sub-steps for determining layout of GUI elements and modules within each DUI screen, and the layout of each DUI screen relative to the other DUI screens, is described below with reference to FIG. 6.

At 408, the display submodule 330 displays the primary DUI screen on the 2D display device 106. The display submodule 330 receives the DUI layout information 322 from the DUI layout module 320. In some embodiments, the DUI layout information 322 includes all necessary GUI element information 216 to enable the display of the DUI screens; in other embodiments, the display submodule 330 may also receive some or all of the GUI element information 216 from the memory 208 in order to display the DUI screens.

At 410, the display submodule 330 displays the secondary DUI screen and any additional DUI screens on the AR display device 104. As in operation 408, the display submodule 330 may use the DUI layout information 322 and/or the GUI element information 216 to display the DUI screens. A detailed set of sub-steps of operation 410 are described below with reference to FIG. 5.

Figure 10B:
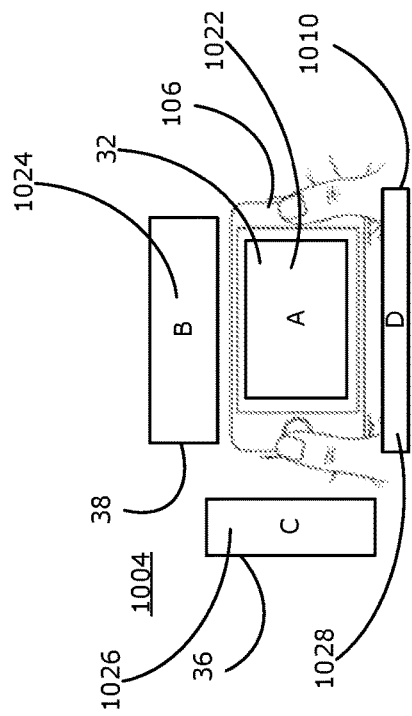
FIG. 10B shows a first example DUI based on the GUI layout information of FIG. 10A, in accordance with examples described herein.
Figure 10A:
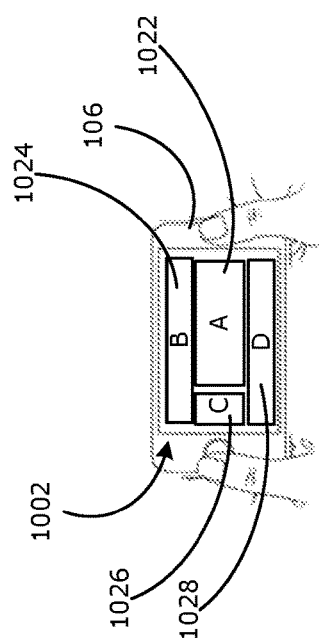
FIG. 10A shows a first example layout of a GUI screen on a 2D display device controlled by GUI layout information in accordance with examples described herein.

FIG. 10B shows an example DUI 1004 consisting of DUI screens displayed on a 2D display device 106 and an AR display device 104 by a computing device 200 performing the method 400, based on the unified GUI 1002 of FIG. 10A. The GUI modularization submodule 310 identifies GUI module A 1022 as the first subset of GUI elements used to generate the primary DUI screen. The GUI modularization submodule 310 further identifies GUI module B 1024, GUI module C 1026, and GUI module D 1028 as each being a second or additional subset of GUI elements, each used to generate the secondary DUI screen or an additional DUI screen. The DUI layout module 320 lays out the GUI elements within each DUI screen; in this example, each GUI module 1022, 1024, 1026, 1028 corresponds to a DUI screen, but the individual GUI elements within each GUI module may be resized, reshaped, and/or repositioned by the DUI layout module 320. The DUI layout module 320 also determines a DUI layout defining the spatial relationships among the DUI screens: i.e., GUI module A 1022 is designated for display on the 2D display device 106 at primary DUI screen virtual location 32, whereas GUI module B 1024 is designated for display by the AR display device 104 at second additional DUI screen virtual location 38, GUI module C 1026 is designated for display by the AR display device 104 at first additional DUI screen virtual location 36, and GUI module D 1028 is designated for display by the AR display device 104 at a third additional DUI screen virtual location 1010. It will be appreciated that, in some examples, one of the additional DUI screens may be considered to be the secondary DUI screen, and the corresponding additional DUI screen locations may be considered to be the secondary DUI screen location.

Figure 10D:
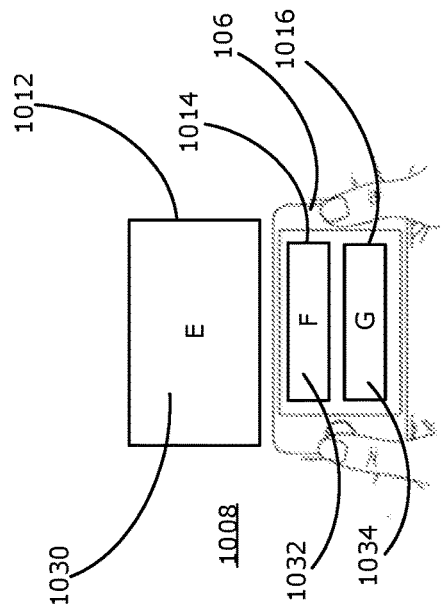
FIG. 10D shows a second example DUI based on the GUI layout information of FIG. 10C, in accordance with examples described herein.
Figure 10C:
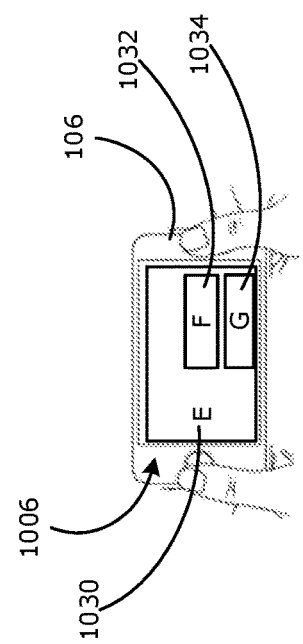
FIG. 10C shows a second example layout of a GUI screen on a 2D display device controlled by GUI layout information in accordance with examples described herein.

Similarly, FIG. 10D shows an example DUI 1008 consisting of DUI screens displayed on a 2D display device 106 and an AR display device 104 by a computing device 200 performing the method 400, based on the unified GUI 1006 of FIG. 10C. The GUI modularization submodule 310 identifies GUI module E 1030 as the first subset of GUI elements used to generate the primary DUI screen. The GUI modularization submodule 310 further identifies GUI module F 1032 and GUI module G 1034 as each being a second or additional subset of GUI elements, each used to generate the secondary DUI screen or an additional DUI screen. The DUI layout module 320 determines the DUI layout: i.e., GUI module E 1030 is designated for display by the AR display device 104 at secondary DUI screen virtual location 1012, whereas GUI module F 1032 is designated for display on the 2D display device 106 at primary DUI screen location 1014, and GUI module G 1034 is designated for display on the 2D display device 106 at a further DUI screen location 1016. In some examples, the two GUI modules displayed on the 2D display device (i.e. GUI module F 1032 and GUI module G 1034) may be laid out together by the DUI layout module 320 such that they are jointly considered a single DUI screen.

The location of each DUI screen, as indicated by the DUI layout information 322, includes the linear and angular location of each DUI screen. The location of a DUI screen may also include the dimensions of the DUI screen. After a location has been determined for a DUI screen and this location has been encoded into the DUI layout information 322, the DUI screen location may be referred to as a placeholder location of the DUI screen. These placeholder locations may be used to switch or swap different DUI screens into the same placeholder locations in the virtual space shown by the AR display device 104 and/or the screen surface of the 2D display device 106. On the 2D display device 106, the DUI screens designated for display thereon are drawn at their placeholder locations on the physical display. Virtual DUI screens displayed by the AR display device 104 may have a placeholder location determined using the sub-steps of operation 410 described below with reference to FIG. 5.

Figure 5:
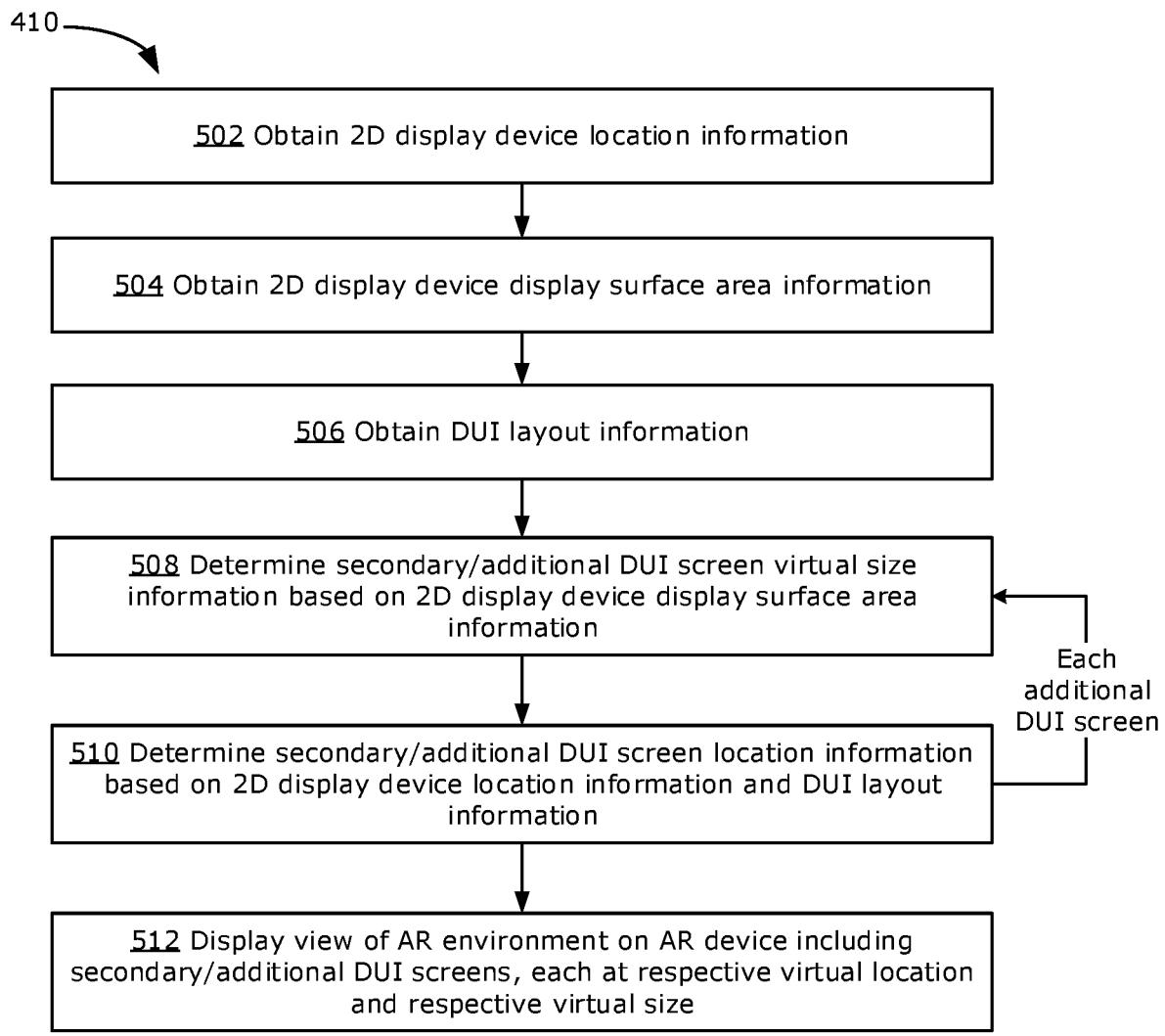
FIG. 5 is a flowchart illustrating example sub-steps of the AR display operation of the method of FIG. 4.

FIG. 5 shows a detailed example of a sequence of sub-steps of the AR display operation 410 of method 400, by which the secondary DUI screen and/or additional DUI screens are displayed on the AR display device 104.

At 502, the display submodule 330 of the computing device 200 obtains 2D display device location information indicating a location of the 2D display device 106. In order to anchor the virtual DUI screens (i.e. the secondary DUI screen and any additional DUI screens) in virtual space around the 2D display device 106, the HMD unit 116 may detect the device in its field of view using a camera of the HMD unit 116 and/or the HMD IMU 112. This detection may be assisted in some embodiments by using fiducial markers on the 2D display device 106, such as an ArUco marker detected by the camera of the HMD unit 116. The HMD camera input 332 may indicate the location of the 2D display device 106 or may be further processed by the display submodule 330 to determine the location of the 2D display device 106. In some embodiments, the location of the 2D display device 106 may be determined by the display submodule 330 in whole or in part using other information, such as location information received from the 2D display device 106 as part of the 2D display device input 336 (e.g., accelerometer data).

At 504, 2D display device display surface area information is obtained by the computing device 200, e.g. by the DUI layout submodule 320 or the display submodule 330. The 2D display device display surface area information indicates a display surface area of the 2D display device 106, either as actual physical dimensions of the physical display, or as virtual dimensions of the physical display as viewed by the HMD camera 103. The 2D display device display surface area information may be used by the DUI layout submodule 320 and/or the display submodule 330 to determine virtual locations for the virtual DUI screens anchored to the 2D display device 106, e.g. to prevent overlapping DUI screens and/or to scale the virtual DUI screens based on the size of the 2D display device 106.

At 506, the DUI layout information 322 is obtained by the display submodule 330. The DUI layout information 322 indicates a fixed spatial relationship between the location of the 2D display device 106 and the secondary DUI screen virtual location (e.g., secondary DUI screen virtual location 34 shown in FIG. 1). The DUI layout information 322 also indicates, for each additional DUI screen, an additional fixed spatial relationship between the location of the 2D display device 106 and the respective additional DUI screen virtual location (e.g., additional DUI screen virtual locations 36 and 38 in FIG. 1, and 1010 in FIG. 10B).

The fixed spatial relationships indicated by the DUI layout information 322 may include an angular position of the secondary or additional DUI screen relative to the 2D display device 106 such that the secondary or additional DUI screen is displayed substantially co-planar with the 2D display device 106. The fixed spatial relationships may also include a linear position of the secondary or additional DUI screen 2D display device 106 such that the secondary or additional DUI screen is displayed proximate to, and non-overlapping with, the 2D display device 106.

At 508, the display submodule 330 processes the 2D display device display surface area information to generate secondary DUI screen virtual size information, as well as virtual size information for any additional DUI screens. The virtual screens of the DUI may be scaled to different sizes based on the size of the 2D display device 106: for example, the DUI screens may be scaled proportionally to the size of the 2D display device 106. Each DUI screen may also have its size determined at least in part based on its virtual location and/or the GUI elements or GUI modules displayed within the DUI screen.

In some examples, the 2D display device 106 is a device with a small display surface area, such as a wearable smart watch or other wearable display. The device may have limited user input capabilities as well as limited screen real estate. The virtual DUI screens may provide larger screen real estate compared to displaying the unified GUI in the small screen real estate of the small device. The virtual DUI screens may accordingly be sized and positioned to complement the ergonomics of viewing a wearable display (e.g., a watch face worn on a wrist) while also expanding the available screen real estate to enable richer information flow and interaction than the small device can by itself.

In some examples, the 2D display device 106 is a monitor of a personal computer (PC), such as a desktop or laptop computer. The physical monitor may have higher visual fidelity than the virtual DUI screens displayed by the AR display device 104, and can therefore be used to show more important contents in a larger view without requiring other GUI elements to be hidden and without the user triggering a simplified GUI view. For example, when Microsoft™ PowerPoint™ is put into presenter mode, the GUI only shows the slide details without showing the overview panel. In the web browser interface for YouTube™, when the video player is put into full-screen mode, the list of upcoming videos is hidden. In some embodiments of the present disclosure, the slide details of a software application like Microsoft™ PowerPoint™ may still occupy the full screen of the PC monitor, while the overview panel may be displayed to the left of the PC monitor as a virtual screen in the AR environment. In the case of YouTube, the video player may occupy the full screen of the PC monitor while the list of upcoming videos may be shown as a virtual screen in the AR environment to the right of the PC monitor.

At 510, the display submodule 330 processes the 2D display device location information to generate DUI screen location information for each DUI virtual screen indicating a virtual location for each DUI virtual screen. A secondary DUI screen virtual location is determined based on the location of the 2D display device 106 and the fixed spatial relationship between the 2D display device 106 and the secondary DUI screen. For each additional DUI screen, an additional DUI screen virtual location is determined based on the location of the 2D display device 106 and the respective additional fixed spatial relationship between the 2D display device 106 and the respective additional DUI screen.

In some examples, operations 508 and 510 may each be performed once for the entire set of DUI virtual screens. In some examples, operations 508 and 510 may repeated for each DUI virtual screen. FIG. 5 shows operations 508 and 510 being repeated multiple times, once for the secondary DUI screen and once for each additional DUI screen.

At 512, the display submodule 330 displays a view of an AR environment on the AR display device including the secondary DUI screen and each additional DUI screen. The secondary DUI screen is located at the secondary DUI screen virtual location in the AR environment, with a virtual size indicated by the secondary DUI screen virtual size information. Each additional DUI screen is located at its respective additional DUI screen virtual location, with a virtual size indicated by the virtual size information for the respective additional DUI screen. Thus, depending on the gaze direction of the user as captured by the HMD IMU 112, the distance of the HMD unit 116 from the 2D display device 106, the orientation of the 2D display device 106 relative to the HMD unit 116, and the fixed spatial relationships between the 2D display device 106 and each virtual DUI screen, the various virtual DUI screens may be displayed from different angles, at different sizes, and at different locations on the AR display device 104.

FIG. 6 shows an example sequence of sub-steps of operation 506 of method 500 for obtaining the GUI layout information. The sub-steps of FIG. 6 may be performed by the GUI layout module 320 to generate the GUI layout information 322. Thus, the sub-steps shown in FIG. 6 could also be considered sub-steps of operation 406 of method 400, in which the DUI screens are generated.

After the GUI modularization information 312 has been generated by the GUI modularization submodule 310, the GUI layout module 320 may generate a directed acyclic graph (DAG) from the list of GUI modules identified in the GUI modularization information 312. At 602, the GUI layout submodule 320 processes the GUI layout information 214 (either obtained from the memory 208 or encoded in the GUI modularization information 312 by the GUI modularization submodule 310) to generate a plurality of constraints. Each constraint defines a vertical dependency or a horizontal dependency between two GUI modules.

At 604, the GUI layout submodule 320 generates the DAG, wherein each GUI module corresponds to a vertex V, and each constraint between two GUI modules corresponds to an edge E between two vertices. A directed edge $E_{AB}$ from vertex $V_A$ to vertex $V_B$ means that the location of GUI module B depends on the position of GUI module A. In some embodiments, the semantic position of GUI module B (left, right, top, or bottom) with respect to GUI module A can be represented by a cell in a two-dimensional array, wherein the source vertex is the row and the destination vertex is the column. The GUI layout submodule 320 performs two topological sorting operations on the DAG.

At 606, the GUI layout submodule 320 considers semantic position constraints that define the vertical relationship between GUI modules, such as top and bottom. The GUI layout submodule 320 topologically sorts the vertices of the DAG based on the vertical dependencies of the DAG, such that the GUI module with the fewest vertical constraints is placed at the top of the sorted order.

At 608, the GUI layout submodule 320 considers semantic position constraints that define the horizontal relationship between GUI modules, such as left and right. The GUI layout submodule 320 topologically sorts the vertices of the DAG based on the horizontal dependencies of the DAG, such that the GUI module with the fewest vertical and horizontal constraints, or the vertex with no incoming edges, is placed at the top of a sorted order of the vertices of the DAG.

At 610, the GUI layout submodule 320 generates the first fixed spatial relationship (between the 2D display device 106 and the secondary DUI screen) and each additional fixed spatial relationship (between the 2D display device 106 and each respective additional DUI screen) based on the sorted order. The GUI module represented by the vertex at the top of the order is positioned first. If a GUI module is designated for display on the 2D display device 106 as part of the primary DUI screen (e.g., as determined at operation 404, as described in greater detail with reference to FIG. 7 below), then the GUI module is positioned based on its absolute position (x, y) in the primary DUI screen. Subsequent GUI modules represented by other vertices in the sorted order are positioned by following the constraints dictated by the GUI modules already designated and laid out in the DUI. For example, if a current vertex from the order represents GUI module P and is constrained to be to the right of GUI module Q, then the DUI layout module 320 will lay out GUI module P to the right of GUI module Q within the primary DUI screen. On the other hand, if the GUI module is designated for display as part of a virtual DUI screen (i.e. the secondary DUI screen or an additional DUI screen), the primary DUI screen may be treated as a single GUI module for the purpose of spatial constraints. This may simplify layout generation by positioning the virtual DUI screens with respect to the 2D display device 106.

The virtual DUI screens are each assigned a location anchored to the 2D display device 106. As mentioned above, the 2D display device 106 is considered as a single GUI module, GUI module X. The location constraints extracted from the semantic tags are adjusted relative to GUI module X. For example, if GUI module A is designated to be drawn as all or part of a virtual DUI screen and GUI module A is constrained to be positioned to the left of GUI module B (which is part of the primary DUI screen, i.e. GUI module X, designated to be displayed on the 2D display device 106), then the constraint between GUI module A and GUI module B may be adjusted such that GUI module A is now positioned to the left of GUI module X (i.e. the primary DUI screen on the 2D display device 106). This allows the DUI screens to render in two different information spaces (i.e. the 2D display device 106 and the AR display device 104) while also remaining in close proximity. In particular, the virtual DUI screens displayed by the AR display device 104 remain anchored to the physical display (i.e. 2D display device 106) within the AR environment.

FIG. 7 shows sub-steps of operation 404, in which the GUI layout information 214 is processed by the GUI modularization submodule 310 and/or the GUI layout module 320 to identify the first subset and second subset of GUI elements (i.e. the first GUI module and second GUI module) that will be designated for display on the primary DUI screen and secondary DUI screen, respectively.

At 702, the GUI modularization submodule 310 and/or GUI layout module 320 process the GUI layout information 214 to identify a primary modality of each of the GUI modules. The semantic tags can have one or more attributes defining an interaction modality and a fidelity score of the GUI module and/or its constituent GUI elements. The interaction modality means a mode of interaction, such as input or output. The fidelity score may be an integer number ranging from 0 to any positive integer. Using the interaction modality and the fidelity score, the GUI modularization submodule 310 and/or GUI layout module 320 may determine whether to designate a given GUI module for display in the primary DUI screen, or one of the virtual DUI screens (e.g. the secondary DUI screen).

At 704, the GUI modularization submodule 310 and/or GUI layout module 320 identify the second subset of the plurality of GUI elements (to be displayed on the AR display device 104) as a GUI module having a primary modality of output. The virtual DUI screens displayed in the AR environment are the best fit for GUI modules that are of a primarily output modality, such as displaying information on a screen. If the semantic tag of a GUI module contains an attribute indicating an output modality of interaction, then the GUI modularization submodule 310 and/or GUI layout module 320 will designate the GUI module to one of the virtual DUI screens (e.g. the secondary DUI screen).

At 706, the GUI modularization submodule 310 and/or GUI layout module 320 identify the first subset of the plurality of GUI elements (to be displayed on the 2D display device 106) as a GUI module having a primary modality of input. If the interaction modality of a GUI module is primarily input, then the GUI module is best fit for display on the 2D display device 106, which typically has input capabilities (such as a touchscreen). If more than one GUI module are best fit for display on the 2D display device 106, then the fidelity score of the GUI modules can resolve ties in cases where two GUI modules are contending for the same space. The GUI module with a higher fidelity score may be designated to the primary DUI screen. Additionally, a candidate GUI module designated to the primary DUI screen may check for spatial constraints with respect to existing or previous GUI modules. For example, if candidate GUI module P is to be placed on top of GUI module Q within the primary DUI screen, the system will calculate if there is enough space on top of GUI module Q to position GUI module P. This is determined by calculating the empty display surface area $A_{empty}$ at the intended location, and the area $A_P$ occupied by GUI module P. If $A_{empty} >= A_P$, then GUI module P can be positioned at the intended location. If $A_{empty} < A_P$, then GUI module P may need to be designated for display in one of the virtual DUI screens (i.e., no displayed on the 2D display device 106).

Thus, for example, the video playback controls of GUI module F 1032 and the video progress bar of GUI module G 1034 in FIG. 10D both have a primarily input modality, and are designated for display by the 2D display device 106, whereas the video content of GUI module E 1030 has a primarily output modality and is designated for display by the AR display device 104.

Example Methods for Switching DUI Focus

Example methods of switching the focus of a DUI, thereby swapping content between two or more of the DUI screens, will now be described with reference to FIGS. 8 and 9. The DUI focus switching method 900 shown in FIG. 9 may be regarded as a further elaboration of, or addition to, the method 400 for displaying the DUI.

Figure 8:
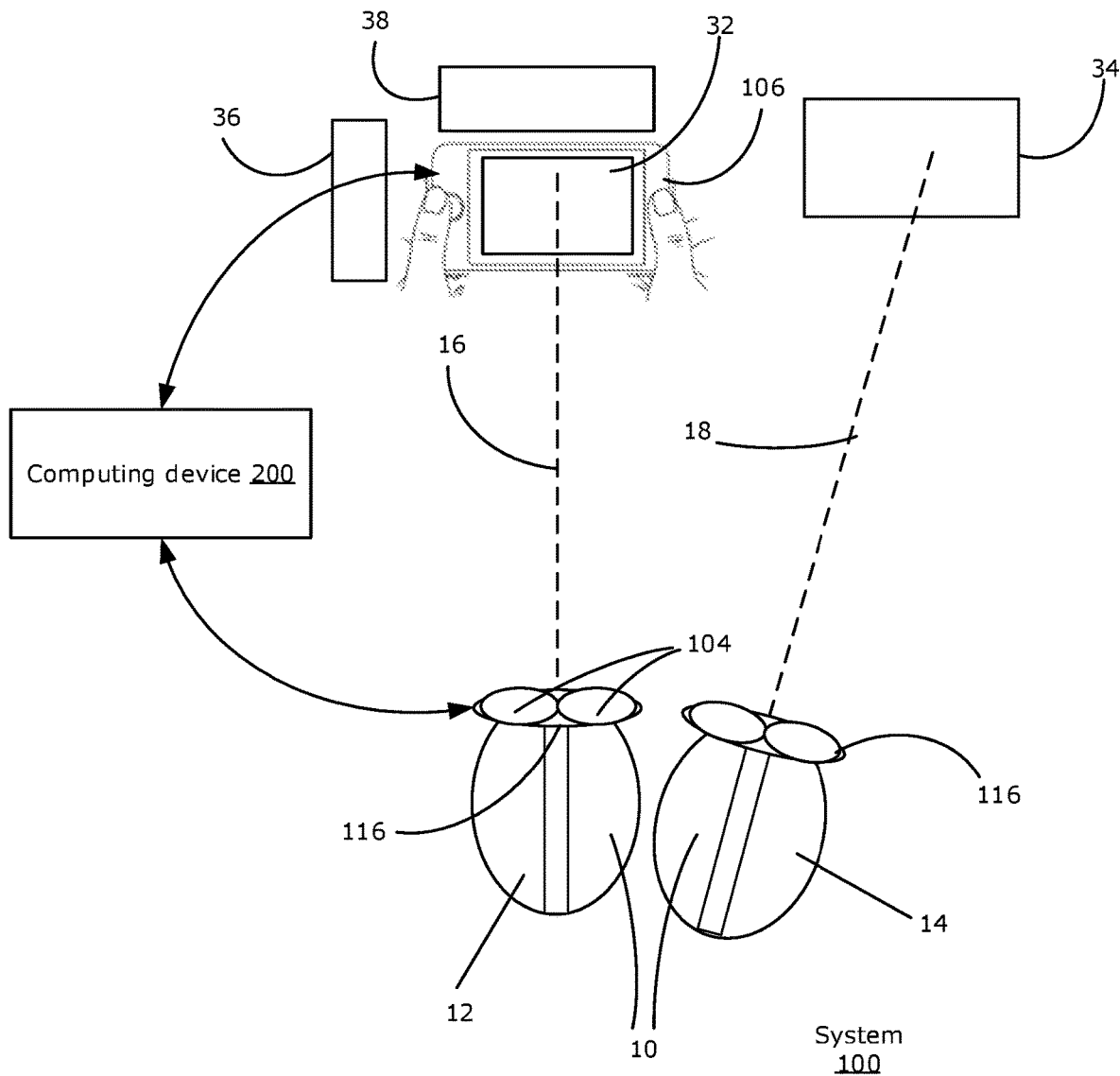
FIG. 8 is a top view of a user interacting with the system of FIGS. 1-2 to switch focus from a first software application instance to a second application instance in a DUI, in accordance with examples described herein.

FIG. 8 shows a user interacting with the system 100 to switch the focus of the DUI. FIG. 8 will be described with reference to the operations of method 900 shown in FIG. 9.

Figure 9:
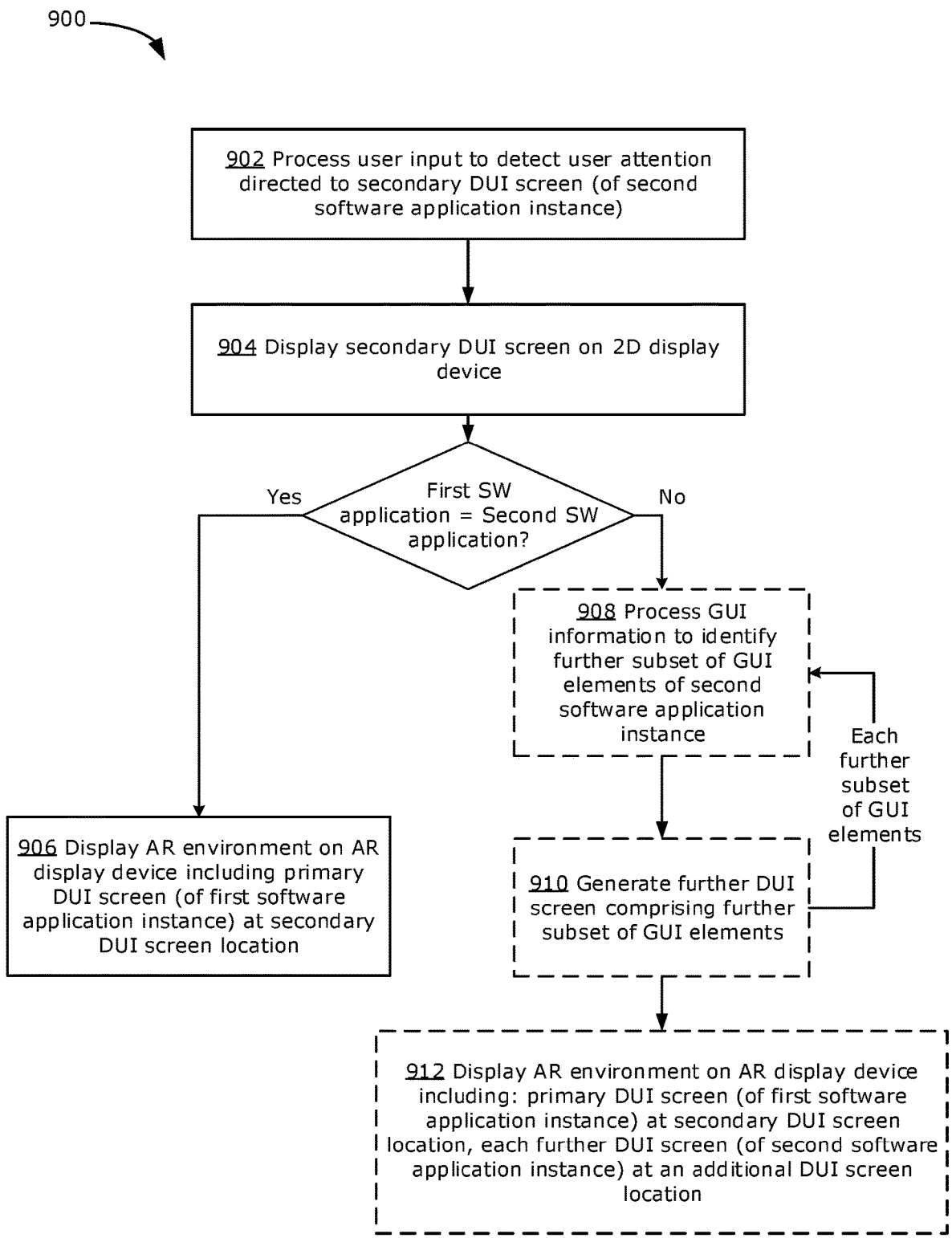
FIG. 9 is a flowchart illustrating an example method for switching focus from a first software application instance to a second application instance in a DUI that may be performed by the DUI module of FIG. 3.

FIG. 9 shows a method 900 of switching DUI focus between two software application instances. DUI screen content at the placeholder locations may be dynamically changed based on changes in user attention indicating a desire to change DUI focus from an instance of a software application to another instance of the same software application or an instance of a different software application with semantically similar structure.

In the example of FIGS. 8-9, the primary DUI screen and secondary DUI screen display GUI elements of a first software application instance and second software application instance, respectively. Thus, the GUI information 212 includes GUI information for the first software application instance and GUI information for the second software application instance, the primary DUI screen (displayed at location 32) is a first DUI screen of the first software application instance, the secondary DUI screen (displayed at virtual location 34) is a first DUI screen of the second software application instance, and the one or more additional DUI screens (displayed at virtual locations 36 and 38) comprise additional DUI screens of the first software application instance (including GUI modules such as a sidebar GUI module and a header GUI module).

Initially, while the user's head 10 is in the first position 12, indicated by first view direction 16, the primary DUI screen is displayed on the 2D display device 106 at the primary DUI screen location 32.

At 902, the focus switching submodule 340 processes user input information (such as head movement information 342 received from the HMD IMU 112) to detect user attention directed to the secondary DUI screen. In some embodiments, the HMD IMU 112 and/or other user input sensors 102 are used to track movement of the head 10. The user's head 10 moves from the first position 12 to a second position 14, indicated by second view direction 18, thereby indicating a change in user gaze or user attention from the primary DUI screen at primary DUI screen location to the secondary DUI screen displayed at secondary DUI screen location 34. The focus switching submodule 340 processes the head movement information 342, and/or other information such as eye gaze information tracked by other user input sensors 102, and determines if the user's gaze is pointed towards one of the virtual screens of the DUI displaying another software application instance (other than the first software application instance displayed in the primary DUI screen). If another instance of the same software application or a different software application with a similar semantic structure is detected, the focus switching submodule 340 switches DUI focus, resulting in changes to the content of the DUI screens located at the placeholder locations, as described below.

In some embodiments, the user can switch focus using user input capabilities of another device, such as the 2D display device 106. For example, if the 2D display device 106 is a smartphone or personal computer, the user may switch focus to a different software application instance by launching the software application from a home menu, or by switching software application instances from a task switcher.

At 904, the focus switching submodule 340 displays the secondary DUI screen on the 2D display device 106, thereby displacing the primary DUI screen.

The method 900 then reconfigures the view of the AR environment displayed on the AR display device 104 to reflect the changed focus of the DUI. In a simple case, in which the first software application instance and the second software application instance are both instances of the same software application, such that the content of the additional DUI screens does not need to change (e.g., the sidebar location 36 and header location 38 display GUI elements that are the same for the first software application instance and second software application instance), the method 900 proceeds to step 906. In a more complex case, in which the first software application instance and the second software application instance are instances of different software applications, such that the content of the additional DUI screens needs to be replaced with GUI elements of the second software application (e.g., the content of the sidebar location 36 and/or header location 38 need to be updated to show GUI elements of the second software application instance), the method proceeds to step 908. In some embodiments, this determination as to updating the contents of the additional DUI screens displayed at the placeholder locations may be performed on a screen-by-screen basis, based on whether the content of each screen is instance-level or application-level content; an example of such a process is described in greater detail below.

At 906, the display submodule 330 displays a view of the AR environment on the AR display device, the AR environment including the primary DUI screen located at the secondary DUI screen virtual location. Thus, the primary DUI screen, no longer displayed on the 2D display device 106, may continue be displayed as a virtual DUI screen at the secondary DUI screen location 34, thereby swapping the primary DUI screen and secondary DUI screen.

At 908, the display submodule 330 processes the GUI layout information 214 to identify a further subset of the plurality of GUI elements. The further subset of GUI elements may be regarded as a further GUI module pertaining to the second software application instance whose content differs from the content of a corresponding GUI module currently displayed in one of the additional DUI screens. For example, the GUI information 212 for the second software application instance may include a subset of GUI elements constituting a navigation bar GUI module whose content differs from the content of a navigation bar GUI module associated with the first software application instance and displayed in the first additional DUI screen at first additional DUI screen location 36.

At 910, the display submodule 330 generates a further DUI screen comprising the GUI element information 216 for each GUI element of the further subset. Thus, the further GUI module pertaining to the second software application instance (e.g., the new navigation bar) may be used to populate a further DUI screen.

Operations 908 and 910 may optionally be repeated one or more times to generate further DUI screens associated with the second software application instance.

At 912, the display submodule 330 displays a view of the AR environment on the AR display device 104 including the primary DUI screen located at the secondary DUI screen virtual location, and each further DUI screen located at one of the additional DUI screen virtual locations. Thus, the primary DUI screen showing the first software application instance is swapped to the former location of the secondary DUI screen at secondary DUI screen location 34, and the new further DUI screens generated at operation 910 are swapped into one or more additional DUI screen locations such as 36 and/or 38.

As mentioned above, some embodiments determine whether to change the content of the additional DUI screens, not based on whether the second software application instance is an instance of the same software application as the first software application instance, but rather based on whether the content displayed at each additional DUI screen (at the level of individual GUI modules within each DUI screen) is application-level content or instance-level content. The DUI layout submodule 320 already has a list of the GUI modules generated by parsing the semantic tags. The focus switching submodule 340 sends focus information 344 to the DUI layout submodule 320 indicating the intent to switch focus to the secondary DUI screen. The DUI layout submodule 320 fetches the GUI modules from the list in sequence. A GUI module can have application-level contents which remain unchanged among different software application instances, or instance-level contents which change between two different software application instances. The semantic tags can have one or more attributes that define the scope of a GUI module, i.e. application-level or instance-level. If the current GUI module from the list is an application-level GUI module, then the contents will remain unchanged. However, if the scope of the GUI module is instance-level, the DUI layout submodule 320 replaces the content displayed at the GUI module's current placeholder location with a corresponding GUI module from the second software application instance. This process is same for both the 2D display device 106 and the virtual DUI screens displayed by the AR display device 104.

Thus, each GUI module displayed may be left unchanged or swapped out for a different GUI module by re-generating or replacing the DUI screen displaying the GUI module (on the 2D display device 106 or the AR display device 104).

Example Alternative Embodiments

In addition to the embodiments and examples described above, various alternative embodiments may be used in place of all or part of any of the embodiments described above. Some such alternative examples and embodiments will now be briefly described.

In some embodiments, the 2D display device 106 may not be used as part of the system 100. Instead, a purely virtual DUI may be displayed in an AR, VR, MR, or XR display device. The display method 400 may be used to parse semantic tags of a unified GUI in order to display the extended screen DUI, and the GUI module switching method 900 may be used to switch focus between different DUI screens.

In some embodiments, the system 100 may automatically identify the semantic tags and display the DUI without being triggered by the user. Alternatively, the user may be able to define a customized DUI layout based on the unified GUI using user input. For example, a user may be able to swipe or flick a moveable GUI element or module towards a boundary of a touch-sensitive physical display, thereby indicating where the corresponding DUI screen should be displayed by the AR display device 104: by touching a GUI module on a touchscreen of the 2D display device 106 and swiping upward, for example, the GUI module will be displayed in a DUI screen located above the 2D display device 106.

In some embodiments, DUI screens may be displayed showing software application instances of dissimilar semantic structure to the first software application instance. The user may be able to provide user input to choose which GUI modules of the semantically dissimilar software application instances should be displayed in various DUI screens when focus is switched to a semantically dissimilar software application instance.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for displaying a distributed user interface (DUI), comprising:
   obtaining graphical user interface (GUI) information of a software application comprising:
      GUI element information for each of a plurality of GUI elements of the software application; and
      GUI layout information for arranging the plurality of GUI elements for presentation as a GUI screen on a two-dimensional (2D) display, the GUI layout information comprising a predetermined semantic structure that defines relationships among the plurality of GUI elements, the predetermined semantic structure being used to define a spatial layout of the plurality of GUI elements when presented on the 2D display, the predetermined semantic structure being defined by the software application;
   processing the GUI layout information to identify, based at least in part on the semantic structure, a first subset of the plurality of GUI elements for display on a primary DUI screen and a second subset of the plurality of GUI elements for display on a secondary DUI screen;
   displaying a primary DUI screen on a 2D display device, the primary DUI screen including the GUI element information of the first subset of the plurality of GUI elements;
   obtaining 2D display device location information indicating a physical location of the 2D display device;
   determining DUI layout information indicating a fixed spatial relationship between the physical location of the 2D display device for displaying the first subset of the plurality of GUI elements and a secondary DUI screen virtual location for displaying the second subset of the plurality of GUI elements, the DUI layout information being determined by:
      generating a directed acyclic graph (DAG) based on the predetermined semantic structure of the GUI layout information, wherein:

each vertex of the DAG corresponding to a GUI module having one or more GUI elements of the plurality of GUI elements; and each edge of the DAG represents a spatial dependency between two GUI modules corresponding to two vertices connected by the edge;

topologically sorting the vertices of the DAG based on the spatial dependencies of the DAG to generate a sorted order of the vertices; and generating the fixed spatial relationship based on the sorted order of the vertices;

wherein the fixed spatial relationship of the DUI layout information preserves the predetermined semantic structure defining relationships between the first subset and the second subset of the plurality of GUI elements;

determining the secondary DUI screen virtual location based on the physical location of the 2D display device and the fixed spatial relationship; and displaying a view of an augmented reality (AR) environment on an AR display device, the AR environment including a secondary DUI screen located at the determined secondary DUI screen virtual location.

2. The method of claim 1, wherein the fixed spatial relationship comprises:

an angular position of the secondary DUI screen such that the secondary DUI screen is displayed substantially co-planar with the 2D display device; and a linear position of the secondary DUI screen such that the secondary DUI screen is displayed proximate to, and non-overlapping with, the 2D display device.

3. The method of claim 1, wherein displaying the view of the AR environment on the AR display device comprises:

obtaining 2D display device display surface area information indicating a display surface area of the 2D display device;

processing the 2D display device display surface area information to generate secondary DUI screen virtual size information; and displaying the view of an AR environment on the AR display device such that the secondary DUI screen is displayed with a virtual size indicated by the secondary DUI screen virtual size information.

4. The method of claim 1, further comprising:

processing the GUI layout information to identify one or more additional subsets of the plurality of GUI elements for display on one or more respective additional DUI screens;

generating one or more additional DUI screens, each additional DUI screen comprising the GUI element information for each GUI element of one of the one or more additional subsets; and displaying the one or more additional DUI screens on the AR display device.

5. The method of claim 4, wherein displaying the one or more additional DUI screens on the AR display device comprises:

determining additional DUI layout information indicating:

for each additional DUI screen, an additional fixed spatial relationship between the physical location of the 2D display device and a respective additional DUI screen virtual location for displaying each respective additional subset of the plurality of GUI elements, wherein the additional fixed spatial relationship of the additional DUI layout information preserves the predetermined semantic structure defining relationships between the first subset of the plurality of GUI elements and each respective additional subset of the plurality of GUI elements;

for each additional DUI screen, determining the respective additional DUI screen virtual location based on the physical location of the 2D display device and the respective additional fixed spatial relationship; and displaying a view of the AR environment on the AR display device, the AR environment further including the one or more additional DUI screens, each additional DUI screen being located at its respective additional DUI screen virtual location.

6. The method of claim 5, wherein:

the primary DUI screen and the one or more additional DUI screens comprise GUI information for a first software application instance;

the secondary DUI screen comprises GUI information for a second software application instance; and the method further comprises:

processing user input information to detect user attention directed to the second software application instance; and swapping the GUI information for the first software application instance on the primary DUI screen and the one or more additional DUI screens with the GUI information for the second software application on the secondary DUI screen.

7. The method of claim 1, wherein the GUI layout information comprises one or more layout definition files, each layout file comprising one or more semantic tags.

8. The method of claim 1, wherein processing the GUI layout information to identify the first subset and second subset comprises:

processing the GUI layout information to identify a primary modality of each of a plurality of GUI modules, each GUI module comprising a subset of the plurality of GUI elements;

identifying the second subset of the plurality of GUI elements as a GUI module having a primary modality of output; and identifying the first subset of the plurality of GUI elements as a GUI module having a primary modality of input.

9. The method of claim 1, wherein:

the GUI information comprises:

GUI information for a first software application instance; and

GUI information for a second software application instance;

the primary DUI screen comprises a first DUI screen of the first software application instance;

the secondary DUI screen comprises a first DUI screen of the second software application instance;

the method further comprising:

processing user input information to detect user attention directed to the secondary DUI screen;

displaying the secondary DUI screen on the 2D display device; and displaying a view of the AR environment on the AR display device, the AR environment including the primary DUI screen located at the secondary DUI screen virtual location.

10. The method of claim 1, wherein:

the GUI information comprises:

GUI information for a first software application instance; and

GUI information for a second software application instance;

the primary DUI screen comprises GUI information for the first software application instance;

the secondary DUI screen comprises the GUI information for the second software application instance; and the method further comprises:
 processing user input information to detect user attention directed to the second software application instance; and
 swapping the GUI information for the first software application instance on the primary DUI screen with the GUI information for the second software application on the secondary DUI screen, resulting in the primary DUI screen presenting the second software application instance and the secondary DUI screen presenting the first software application instance.

11. The method of claim 1, further comprising:
processing the GUI layout information to generate a plurality of constraints defining the spatial dependencies, each spatial dependency being a vertical dependency or a horizontal dependency between two GUI modules.

12. A system for displaying a distributed user interface (DUI), comprising:
a processor device; and
a memory storing machine-executable instructions thereon which, when executed by the processor device, cause the system to:
 obtain graphical user interface (GUI) information of a software application comprising:
  GUI element information for each of a plurality of GUI elements of the software application; and
  GUI layout information for arranging the plurality of GUI elements for presentation as a GUI screen on a two-dimensional (2D) display, the GUI layout information comprising a predetermined semantic structure that defines relationships among the plurality of GUI elements, the predetermined semantic structure being used to define a spatial layout of the plurality of GUI elements when presented on the 2D display, the predetermined semantic structure being defined by the software application;
 process the GUI layout information to identify, based at least in part on the semantic structure, a first subset of the plurality of GUI elements for display on a primary DUI screen and a second subset of the plurality of GUI elements for display on a secondary DUI screen;
 display a primary DUI screen on the 2D display device, the primary DUI screen including the GUI element information of the first subset of the plurality of GUI elements;
 obtain 2D display device location information indicating a physical location of the 2D display device;
 determine DUI layout information indicating a fixed spatial relationship between the physical location of the 2D display device for displaying the first subset of the plurality of GUI elements and a secondary DUI screen virtual location for displaying the second subset of the plurality of GUI elements, the DUI layout information being determined by:
  generating a directed acyclic graph (DAG) based on the predetermined semantic structure of the GUI layout information, wherein:
   each vertex of the DAG corresponding to a GUI module having one or more GUI elements of the plurality of GUI elements; and
   each edge of the DAG represents a spatial dependency between two GUI modules corresponding to two vertices connected by the edge;
  topologically sorting the vertices of the DAG based on the spatial dependencies of the DAG to generate a sorted order of the vertices; and
  generating the fixed spatial relationship based on the sorted order of the vertices;
 wherein the fixed spatial relationship of the DUI layout information preserves the predetermined semantic structure defining relationships between the first subset and the second subset of the plurality of GUI elements;
 determine the secondary DUI screen virtual location based on the physical location of the 2D display device and the fixed spatial relationship; and
 display a view of an augmented reality (AR) environment on an AR display device, the AR environment including a secondary DUI screen located at the determined secondary DUI screen virtual location.

13. The system of claim 12, wherein
the fixed spatial relationship comprises:
 an angular position of the secondary DUI screen such that the secondary DUI screen is displayed substantially co-planar with the 2D display device; and
 a linear position of the secondary DUI screen such that the secondary DUI screen is displayed proximate to, and non-overlapping with, the 2D display device; and
wherein displaying the view of the AR environment on the AR display device comprises:
 obtaining 2D display device display surface area information indicating a display surface area of the 2D display device;
 processing the 2D display device display surface area information to generate secondary DUI screen virtual size information; and
 displaying the view of the AR environment on the AR display device such that the secondary DUI screen is displayed with a virtual size indicated by the secondary DUI screen virtual size information.

14. The system of claim 12, wherein the machine-executable instructions, when executed by the processor device, further cause the system to:
 process the GUI layout information to identify one or more additional subsets of the plurality of GUI elements for display on one or more respective additional DUI screens;
 generate one or more additional DUI screens, each additional DUI screen comprising the GUI element information for each GUI element of one of the one or more additional subsets; and
 display the one or more additional DUI screens on the AR display device.

15. The system of claim 14, wherein displaying the one or more additional DUI screens on the AR display device comprises:
 determining additional DUI layout information indicating:
  for each additional DUI screen, an additional fixed spatial relationship between the physical location of the 2D display device and a respective additional DUI screen virtual location for displaying each respective additional subset of the plurality of GUI elements, wherein the additional fixed spatial relationship of the additional DUI layout information preserves the predetermined semantic structure defining relationships between the first subset of the plurality of GUI elements and each respective additional subset of the plurality of GUI elements;

for each additional DUI screen, determining the respective additional DUI screen virtual location based on the physical location of the 2D display device and the respective additional fixed spatial relationship; and displaying a view of the AR environment on the AR display device, the AR environment further including the one or more additional DUI screens, each additional DUI screen being located at its respective additional DUI screen virtual location.

16. The system of claim 12, wherein processing the GUI layout information to identify the first subset and second subset comprises:

processing the GUI layout information to identify a primary modality of each of a plurality of GUI modules, each GUI module comprising a subset of the plurality of GUI elements;

identifying the second subset of the plurality of GUI elements as a GUI module having a primary modality of output; and identifying the first subset of the plurality of GUI elements as a GUI module having a primary modality of input.

17. The system of claim 12, further comprising at least one of:
the 2D display device; or
the AR display device.

18. The system of claim 12, wherein:
the GUI information comprises:
GUI information for a first software application instance; and
GUI information for a second software application instance;
the primary DUI screen comprises GUI information for the first software application instance;
the secondary DUI screen comprises the GUI information for the second software application instance; and
wherein the machine-executable instructions, when executed by the processor device, further cause the system to:
process user input information to detect user attention directed to the second software application instance; and
swap the GUI information for the first software application instance on the primary DUI screen with the GUI information for the second software application on the secondary DUI screen, resulting in the primary DUI screen presenting the second software application instance and the secondary DUI screen presenting the first software application instance.

19. A non-transitory processor-readable medium having machine-executable instructions stored thereon which, when executed by a processor device of a device, cause the device to:
obtain graphical user interface (GUI) information of a software application comprising:
GUI element information for each of a plurality of GUI elements of the software application; and
GUI layout information for arranging the plurality of GUI elements for presentation as a GUI screen on a two-dimensional (2D) display, the GUI layout information comprising a predetermined semantic structure that defines relationships among the plurality of GUI elements, the predetermined semantic structure being used to define a spatial layout of the plurality of GUI elements when presented on the 2D display, the predetermined semantic structure being defined by the software application;

process the GUI layout information to identify, based at least in part on the semantic structure, a first subset of the plurality of GUI elements for display on a primary DUI screen and a second subset of the plurality of GUI elements for display on a secondary DUI screen;

display a primary DUI screen on a 2D display device, the primary DUI screen including the GUI element information of the first subset of the plurality of GUI elements;

obtain 2D display device location information indicating a physical location of the 2D display device;

determine DUI layout information indicating a fixed spatial relationship between the physical location of the 2D display device for displaying the first subset of the plurality of GUI elements and a secondary DUI screen virtual location for displaying the second subset of the plurality of GUI elements, the DUI layout information being determined by:

generating a directed acyclic graph (DAG) based on the predetermined semantic structure of the GUI layout information, wherein:
each vertex of the DAG corresponding to a GUI module having one or more GUI elements of the plurality of GUI elements; and
each edge of the DAG represents a spatial dependency between two GUI modules corresponding to two vertices connected by the edge;

topologically sorting the vertices of the DAG based on the spatial dependencies of the DAG to generate a sorted order of the vertices; and generating the fixed spatial relationship based on the sorted order of the vertices;

wherein the fixed spatial relationship of the DUI layout information preserves the predetermined semantic structure defining relationships between the first subset and the second subset of the plurality of GUI elements;

determine the secondary DUI screen virtual location based on the physical location of the 2D display device and the fixed spatial relationship; and display a view of an augmented reality (AR) environment on an AR display device, the AR environment including a secondary DUI screen located at the determined secondary DUI screen virtual location.

20. The non-transitory processor-readable medium of claim 19, wherein:
the GUI information comprises:
GUI information for a first software application instance; and
GUI information for a second software application instance;
the primary DUI screen comprises GUI information for the first software application instance;
the secondary DUI screen comprises the GUI information for the second software application instance; and
wherein the machine-executable instructions, when executed by the processor device, further cause the device to:
process user input information to detect user attention directed to the second software application instance; and
swap the GUI information for the first software application instance on the primary DUI screen with the GUI information for the second software application on the secondary DUI screen, resulting in the primary DUI screen presenting the second software application instance and the secondary DUI screen presenting the first software application instance.

\* \* \* \* \*